(12) United States Patent
Huang et al.

(10) Patent No.: US 11,924,806 B2
(45) Date of Patent: Mar. 5, 2024

(54) PAGING AND MEASUREMENT IN NR IDLE

(71) Applicant: Apple Inc., Cupertino, CA (US)

(72) Inventors: Rui Huang, Beijing (CN); Zhibin Yu, Unterhaching BY (DE); Jie Cui, Santa Clara, CA (US); Yang Tang, San Jose, CA (US); Hua Li, Beijing (CN)

(73) Assignee: Apple Inc., Cupertino, CA (US)

( * ) Notice: Subject to any disclaimer, the term of this patent is extended or adjusted under 35 U.S.C. 154(b) by 238 days.

(21) Appl. No.: 17/267,782

(22) PCT Filed: Aug. 8, 2019

(86) PCT No.: PCT/US2019/045658
§ 371 (c)(1),
(2) Date: Feb. 10, 2021

(87) PCT Pub. No.: WO2020/033648
PCT Pub. Date: Feb. 13, 2020

(65) Prior Publication Data
US 2021/0274465 A1    Sep. 2, 2021

Related U.S. Application Data

(60) Provisional application No. 62/717,550, filed on Aug. 10, 2018.

(51) Int. Cl.
*H04W 24/10* (2009.01)
*H04J 11/00* (2006.01)
(Continued)

(52) U.S. Cl.
CPC ....... *H04W 68/005* (2013.01); *H04J 11/0073* (2013.01); *H04J 11/0076* (2013.01);
(Continued)

(58) Field of Classification Search
CPC ... H04W 68/005; H04W 24/08; H04W 24/10; H04W 56/001; H04W 76/28; H04W 68/02; H04J 11/0073; H04J 11/0076
See application file for complete search history.

(56) References Cited

U.S. PATENT DOCUMENTS

2015/0257042 A1    9/2015   Su et al.
2015/0257199 A1    9/2015   Su
(Continued)

FOREIGN PATENT DOCUMENTS

| CN | 102598816 A | 7/2012 |
|---|---|---|
| CN | 102761890 A | 10/2012 |

(Continued)

OTHER PUBLICATIONS

MediaTek Inc., Remaining Issue Discussion on Idle State for SA NR, Jul. 2-Jul. 6, 2018, 3GPP TSG-RAN WG4 Meeting # AH1807, R4-1808830, Montreal, Canada, (Year: 2018).*

(Continued)

*Primary Examiner* — Said M Elnoubi
(74) *Attorney, Agent, or Firm* — Sterne, Kessler, Goldstein & Fox P.L.L.C.

(57) ABSTRACT

Systems, apparatuses, methods, and computer-readable media are provided for user equipment (UE) idle mode operations. In embodiments, a UE wakes up more than once during a Discontinuous Reception (DRX) cycle. Inter-frequency measurement requirements may be relaxed based on DRX cycle length. Some embodiments include radiofrequency (RF) circuitry warm-up overhead reduction by on-duration separation with RF circuitry switching pattern adaption. Some embodiments include and RF circuitry warm-up overhead reduction by adaptive synchronization signal block (SSB) reference symbol down-selection. Other embodiments may be described and/or claimed.

19 Claims, 9 Drawing Sheets

(51) Int. Cl.
  *H04W 24/08* (2009.01)
  *H04W 56/00* (2009.01)
  *H04W 68/00* (2009.01)
  *H04W 76/28* (2018.01)

(52) U.S. Cl.
  CPC .......... *H04W 24/08* (2013.01); *H04W 24/10* (2013.01); *H04W 56/001* (2013.01); *H04W 76/28* (2018.02)

(56) References Cited

U.S. PATENT DOCUMENTS

| | | |
|---|---|---|
| 2017/0099649 A1 | 4/2017 | Vos et al. |
| 2018/0077724 A1 | 3/2018 | Kim et al. |
| 2018/0220345 A1 | 8/2018 | Moon et al. |

FOREIGN PATENT DOCUMENTS

| | | |
|---|---|---|
| CN | 103597882 A | 2/2014 |
| CN | 104025679 A | 9/2014 |
| CN | 104219764 A | 12/2014 |
| CN | 104902506 A | 9/2015 |
| CN | 104968035 A | 10/2015 |
| CN | 107113776 A | 8/2017 |
| WO | WO 2011/002820 A1 | 1/2011 |
| WO | WO 2012/131655 A1 | 10/2012 |
| WO | WO 2013/067016 A1 | 5/2013 |
| WO | WO 2016/136143 A1 | 9/2016 |
| WO | WO 2016/182532 A1 | 11/2016 |
| WO | WO-2017065852 A1 * | 4/2017 .......... H04B 17/345 |
| WO | WO 2018/144873 A1 | 8/2018 |

OTHER PUBLICATIONS

International Search Report directed to related International Patent Application PCT/US2019/045658, dated Nov. 25, 2019; 2 pages.
Nokia et al., "Paging in NR", R1-1800806, 3GPP TSG-RAN WG1 NR AH #18-01, Vancouver, Canada, Jan. 12, 2018. See Annex A.
Ericsson, Impact of Paging Occasions on Measurement Requirements', R4-1809135, 3GPP TSG RAN WG4 Meeting #87, Busan, Korea, Jun. 25, 2018. See sections 2.1-3.
Awada, A. and Michalaopoulus, D.S., "Energy Saving voa Efficient Allocation of Paging Frames," 2018 IEEE Conference on Standards for Communications and Networking (CSCN), Paris, France, 2018, pp. 1-5, doi: 10.1109/CSCN.2018.8581825.
Mediatek Inc. "Discussion on idle state for SA NR," 3GPP TSG-RAN WG4 Meeting #87, R4-1806534, Busan, Korea, May 21-26, 2018, 7 pages.
Wu, Jiong, "Research on Discontinuous Reception Mechanism in LTE-A System," China Excellent Master's Thesis, China Academic Journal Electronic Publishing House, Copyright 1994-2022, 73 pages.
Patent Search Report, dated Dec. 28, 2023, for Chinese Patent Appl. No. 2019800534495, 7 pages including English translation.

* cited by examiner

PAGING AND MEASUREMENT IN NR IDLE

RELATED APPLICATIONS

This application is a national phase entry of PCT/US2019/045658, filed on Aug. 8, 2019, which claims priority to U.S. Provisional App. No. 62/717,550, filed Aug. 10, 2018, the contents of both of which are hereby incorporated by reference in their entireties.

FIELD

Various embodiments of the present application generally relate to the field of wireless communications, and in particular, to user equipment idle mode operations.

BACKGROUND

In cellular communication networks, paging procedures are used to inform or notify a user equipment (UE) about various events such as a change in system information (SI), provide Public Warning System (PWS) notifications, and the like. The paging procedure is used by the network (NW) to transmit paging information to the UE when the UE is in an idle or inactive mode. Recently, various idle and inactive mode mobility requirements have been approved for New Radio (NR) or Fifth Generation (5G) systems. However, these idle and inactive mode mobility requirements do not address the impacts on measurement requirements due to Paging Occasion (PO) collisions.

DETAILED DESCRIPTION

Embodiments discussed herein provide enhancements to user equipment (UE) operation in idle and/or inactive modes to realize reduction in power consumption. The embodiments herein also address impacts on measurement requirements due to Paging Occasion (PO) collisions.

Figure 1:
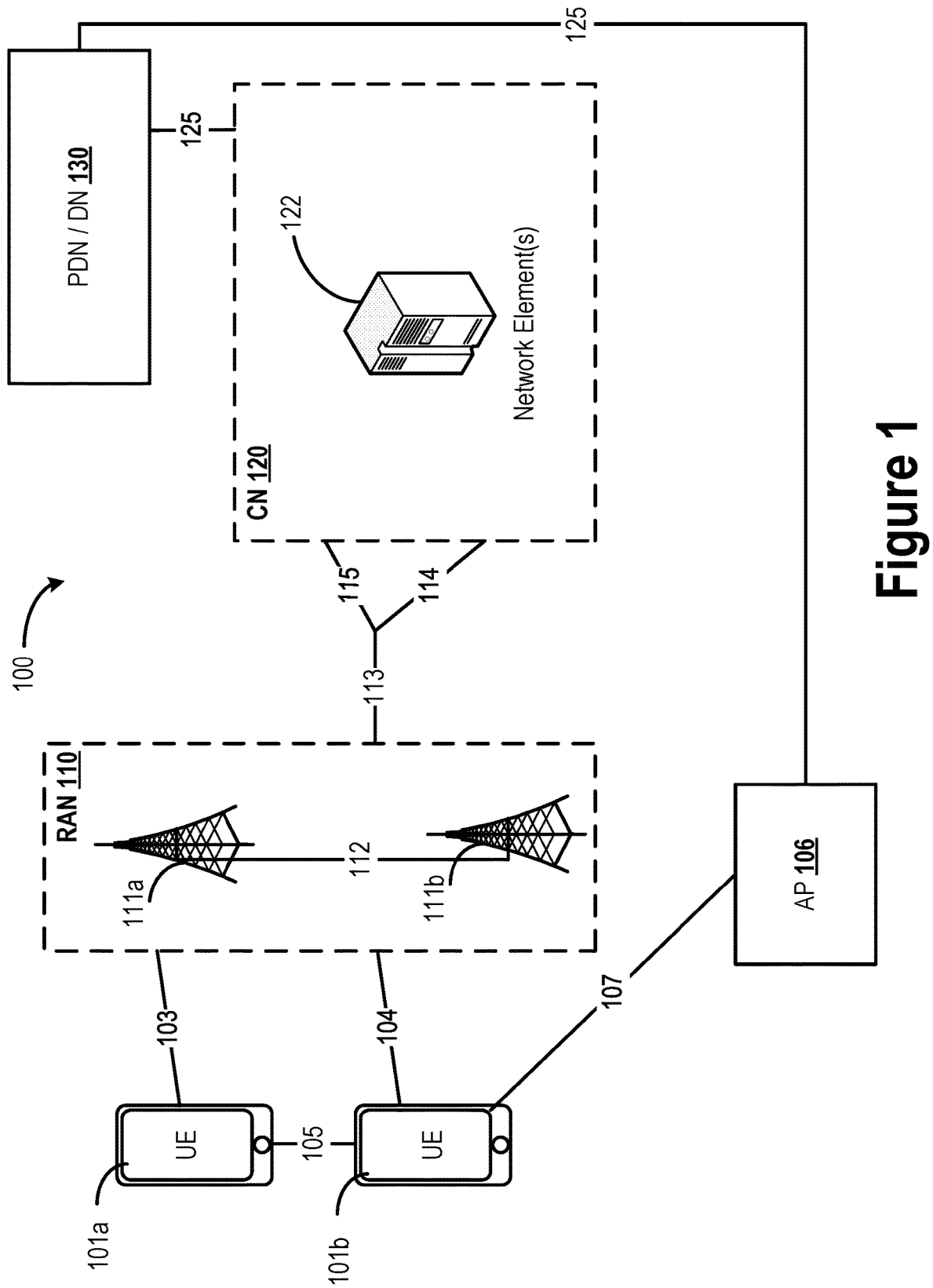
FIG. 1 depicts an architecture of a system of a network in accordance with some embodiments.

Referring now to FIG. 1, in which an example architecture of a system 100 of a network according to various embodiments, is illustrated. The following description is provided for an example system 100 that operates in conjunction with the Fifth Generation (5G) or New Radio (NR) system standards or Long Term Evolution (LTE) system standards as provided by the Third Generation Partnership Project (3GPP) technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., Wireless Metropolitan Area Network (WMAN), Worldwide Interoperability for Microwave Access (WiMAX), etc.), or the like.

As shown by FIG. 1, the system 100 includes user equipment (UE) 101a and UE 101b (collectively referred to as "UEs 101" or "UE 101"). A UE 101 is any device with radio communication capabilities, such as a wireless communications interface, and describes a remote user of network resources in a communications network. In this example, UEs 101 are illustrated as smartphones, but may also comprise any mobile or non-mobile computing device, such as consumer tablet computers, wearable devices, desktop computers, laptop computers, in-vehicle infotainment (IVI) devices, head-up display (HUD) devices, Internet of Things (IoT) devices, embedded systems or microcontrollers, networked or "smart" appliances, and/or the like. The UEs 101 include various hardware elements such as baseband circuitry, memory circuitry, radiofrequency (RF) circuitry, and interface circuitry (e.g., input/output (I/O) interfaces), some or all of which may be coupled with one another via a suitable interconnect (IX) technology. The RF circuitry includes various hardware elements (e.g., switches, filters, amplifiers, digital signal processors (DSPs), etc.) configured to enable communication with wireless networks using modulated electromagnetic radiation through a non-solid medium. The electronic elements may be arranged as receive signal path (or receiving (Rx) RF chain) to down-convert received RF signals and provide baseband signals to the baseband circuitry, and arranged as a transmit signal path to up-convert baseband signals provided by the baseband circuitry and provide RF output signals to an antenna array via a front-end module for transmission. The baseband circuitry and RF circuitry allow the UEs 101 to connect or communicatively couple with a Radio Access Network (RAN) 110.

The RAN 110 is a set of RAN nodes 111 that implement a Radio Access Technology (RAT); the term "RAT" as used herein refers to a type of technology used for radio access such as NR, E-UTRA, WiFi/WLAN, and/or the like. The set of RAN nodes 111 in the RAN 110 are connected to one another via interface 112 and connected to the CN 120 through interface 113. In embodiments, the RAN 110 may be a Universal Terrestrial Radio Access Network (UTRAN) or Groupe Special Mobile (GSM)/Enhanced Datarates for GSM (EDGE) RAN (GERAN) when system 100 is an UTRAN or GERAN system, an Evolved UTRAN (E-UTRAN) when system 100 is an LTE or 4G system, or a next generation (NG) RAN or a 5G RAN when system 100 is an NR/5G system. The UEs 101 utilize connections (or channels) 103 and 104, respectively, each of which comprises a physical communications interface or layer. The term "channel" or "link" as used herein refers to any transmission medium, either tangible or intangible, which is used to communicate data or a data stream. Additionally, the term "link" as used herein refers to a connection between two devices through a RAT for the purpose of transmitting and receiving information. In FIG. 1, the connections 103 and 104 are illustrated as an air interface to enable communicative coupling, and can be consistent with cellular communications protocols, such as GSM, Code-Division Multiple Access (CDMA), Push-to-Talk (PTT) and/or PPT over cellular (POC), UMTS, LTE, 5G/NR, and/or the like. The UEs 101 may also directly exchange data via a Proximity Services (ProSe) or sidelink (SL) interface 105 comprising one or more physical and/or logical SL channels.

The RAN 110 includes one or more RAN nodes 111*a* and 111*b* (collectively referred to as "RAN nodes 111" or "RAN node 111") that enable the connections 103 and 104. The RAN nodes 111 are infrastructure equipment that provide the radio baseband functions for data and/or voice connectivity between a network (e.g., core network (CN) 120) and one or more users (e.g., UEs 101). The RAN nodes 111 can be referred to as NodeBs 111 in UMTS systems, evolved NodeBs (eNBs) 111 in LTE systems, next generation NodeBs (gNBs) 111 or next generation eNBs (ng-eNBs) in 5G/NR systems, Road Side Units (RSUs) for vehicle-to-everything (V2X) implementations, and so forth. The RAN nodes 111 can comprise ground stations (e.g., terrestrial access points) or satellite stations providing coverage within a geographic area (e.g., a cell). The RAN nodes 111 may be implemented as one or more dedicated physical devices such as a macrocell base stations, and/or a low power base stations for providing femtocells, picocells, or other like cells having smaller coverage areas, smaller user capacity, or higher bandwidth compared to macrocells. Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some embodiments, all or parts of the RAN nodes 111 may be implemented as one or more software entities running on server computers as part of a virtual network (e.g., a cloud RAN (CRAN), virtual baseband unit pool (vBBUP), or the like). In these embodiments, the RAN nodes 111 may implement a RAN function split where different protocol entities are operated by different elements. The term "element" as used herein refers to a unit that is indivisible at a given level of abstraction and has a clearly defined boundary. One or more RAN nodes 111 may represent individual distributed units (DUs) that are connected to centralized unit (CU) via respective F1 interfaces (not shown by FIG. 1). In these implementations, the gNB-DUs may include one or more remote radio heads or RFEMs, and the gNB-CU may be operated by a server that is located in the RAN 110 (not shown) or by a server pool in a similar manner as a CRAN/vBBUP.

The RAN nodes 111 may be configured to communicate with one another via interface 112. The interface 112 may include a user plane interface for carrying user plane data between the RAN nodes 111, and a control plane interface for carrying control signaling between the RAN nodes 111. The interface 112 may be an X2 interface 112 when the system 100 is an LTE system, and the interface 112 may be an Xn interface 112 when the system 100 is a 5G/NR system.

The UE 101*b* is shown to be configured to access an access point (AP) 106 via connection 107. The connection 107 can comprise a local wireless area network (WLAN) connection consistent with any IEEE 802.11 protocol, wherein the AP 106 may be a WiFi® router, gateway appliance, or the like. In this example, the AP 106 is shown to be connected to the Internet without connecting to the core network of the wireless system (described in further detail below). In various embodiments, the UE 101*b*, RAN 110, and AP 106 may be configured to utilize LTE-WLAN aggregation (LWA) operation and/or LTE/WLAN Radio Level Integration with IPsec Tunnel (LWIP) operation.

In embodiments, the UEs 101 can be configured to communicate using Orthogonal Frequency Division Multiplexing (OFDM) communication signals with each other or with any of the RAN nodes 111 over a multicarrier communication channel in accordance with various communication techniques, such as, but not limited to, an OFDMA communication technique (e.g., for downlink (DL) communications) or a Single Carrier Frequency Division Multiple Access (SC-FDMA) communication technique (e.g., for uplink (UL) and ProSe/SL communications), although the scope of the embodiments is not limited in this respect. The OFDM signals can comprise a plurality of orthogonal subcarriers.

DL and UL transmissions may be organized into frames with 10 ms durations, where each frame includes ten 1 ms subframes, and each subframe includes an integer number of slots. Time-frequency radio resource grids may be used to indicate physical resources in the DL or UL in corresponding slots. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. Each element in the resource grid for an antenna port and a subcarrier spacing configuration is called an resource element (RE). A collection of REs make up a resource block (RB). An antenna port is defined such that the channel over which a symbol on the antenna port is conveyed can be inferred from the channel over which another symbol on the same antenna port is conveyed.

There are several different physical channels and physical signals that are conveyed using RBs, Physical RBs (PRBs), and/or individual REs. A physical channel corresponds to a set of REs carrying information originating from higher layers and include Physical UL channels (e.g., physical UL shared channel (PUSCH), physical UL control channel (PUCCH), physical random access channel (PRACH), etc.) and physical DL channels (e.g., physical DL shared channel (PDSCH), physical DL control channel (PDCCH), physical broadcast channel (PBCH), etc.). A physical signal is used by the physical layer (PHY) but does not carry information originating from higher layers, and include Physical UL signals (e.g., Demodulation Reference Signal (DMRS), Phase-Tracking Reference Signal (PTRS), Sounding Reference Signal (SRS), etc.) and physical DL signals (e.g., DMRS, PTRS, Channel State Information Reference Signal (CSI-RS), Primary Synchronization Signal (PSS), Secondary Synchronization Signal (SSS), etc.).

The PDSCH carries user data and higher-layer signaling to the UEs 101, and the PDCCH carries DL resource assignment information for receiving the PDSCH. Each UE 101 monitors a set of PDCCH candidates on one or more activated serving cells as configured by higher layer signaling for control information (e.g., Downlink Control Information (DCI)), where monitoring implies attempting to decode a set of PDCCH candidates according one or more monitored DCI formats (e.g., DCI formats 0 through 6-2 as discussed in section 5.3.3 of 3GPP TS 38.212 v15.1.1 (2018-04), DCI formats 0_0 through 2_3 as discussed in section 7.3 of 3GPP TS 38.212 v15.1.1 (2018-04), or the like). The DCI includes, inter alia, DL assignments and/or UL scheduling grants including, for example, modulation and coding format, resource allocation, and HARQ information, among other information/commands. Each UE 101 monitors (or attempts to decode) respective sets of PDCCH candidates in one or more configured monitoring occasions according to UE or cell-specific search spaces (for LTE systems), or monitors (or attempts to decode) respective sets of PDCCH candidates in one or more configured monitoring occasions in one or more configured Control Resource Sets (CORESETs) according to corresponding search space configurations (for NR/5G systems).

The RAN 110 is shown to be communicatively coupled to a core network (CN) 120 comprising one or more network elements 122, which are configured to offer various data and telecommunications services to customers/subscribers (e.g., users of UEs 101) who are connected to the CN 120 via the RAN 110. The term "network element" as used herein refers to physical or virtualized equipment and/or infrastructure used to provide wired or wireless communication network services, and may be considered synonymous with, and/or referred to as, a networked computer, networking hardware, network equipment, network node, router, switch, hub, bridge, radio network controller (RNC), RAN device, RAN node, gateway, server, cloud node, Virtualized Network Function (VNF), NFV Infrastructure (NFVI), and/or the like. The network elements 122 may be one or more server computer systems, which may implement various CN elements (e.g., network functions (NFs) and/or application functions (AFs)) such as those discussed herein. The components of the CN 120 may be implemented in one physical node or separate physical nodes including components to read and execute instructions from a machine-readable or computer-readable medium (e.g., a non-transitory machine-readable storage medium). In some embodiments, Network Function Virtualization (NFV) may be utilized to virtualize any or all network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. As used herein, the terms "instantiate," "instantiation," and the like refers to the creation of an instance, and an "instance" refers to a concrete occurrence of an object, which may occur, for example, during execution of program code. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more NFs/AFs.

In embodiments where the CN 120 is an Evolved Packet Core (EPC) in LTE systems, the one or more network elements 122 may include or operate one or more Mobility Management Entities (MMEs), Serving Gateways (S-GWs), PDN Gateways (P-GWs), Home Subscriber Servers (HSSs), Policy Control and Charging Rules Functions (PCRFs), and/or other like LTE CN elements. In these embodiments, the E-UTRAN 110 may be connected with the EPC 120 via an S1 interface 113. In these embodiments, the S1 interface 113 is split into two parts: an S1-U interface 114 to carry traffic data between the RAN nodes 111 and the S-GW, and the S1-MME interface 115, which is a signaling interface between the RAN nodes 111 and MMEs. Additionally, the P-GW within the EPC 120 may route data packets between the EPC 120 and external networks such as a network including a Packet Data Network (PDN) 130 via an Internet Protocol (IP) interface 125. The PDN 130 may be an operator external public, a private PDN (e.g., enterprise network, cloud computing service, etc.), or an intra-operator PDN (e.g., for provision of IMS and/or IP-CAN services).

In embodiments where the CN 120 is a 5GC 120, the network elements 122 may implement one or more instances of an Authentication Server Function (AUSF), Access and Mobility Management Function (AMF), Session Management Function (SMF), Network Exposure Function (NEF), Policy Control Function (PCF), NF Repository Function (NRF), Unified Data Management (UDM) entity, AF, User Plane Function (UPF), Short Message Service Function (SMSF), Non-3GPP Interworking Function (N3IWF), Network Slice Selection Function (NSSF), and/or other like NR NFs. In such embodiments, the NG-RAN 110 may be connected with the 5GC 120 via an NG interface 113. In these embodiments, the NG interface 113 may be split into two parts, an NG-U interface 114, which carries traffic data between the RAN nodes 111 and a UPF, and the NG-C interface 115, which is a signaling interface between the RAN nodes 111 and AMFs. Additionally, the UPF within the 5GC 120 may perform packet routing, filtering, inspection, forwarding, etc., between the 5GC 120 and external networks such as a data network (DN) 130 via an IP interface 125. The DN 130 may represent one or more DNs including one or more Local Area DNs (LADNs), and may be an operator external public, a private PDN, an intra-operator PDN as discussed previously.

The CN 120 is shown to be communicatively coupled to PDN/DN 130 via an IP communications interface 125. The PDN/DN 130 may include one or more application servers (AS). The application server(s) (and the network element(s) 122) comprise one or more physical and/or virtualized systems for providing functionality (or services) to one or more clients (e.g., UEs 101) over a network. Such servers may include various computer devices with rack computing architecture component(s), tower computing architecture component(s), blade computing architecture component(s), and/or the like. The server(s) may represent a cluster of servers, a server farm, a cloud computing service, or other grouping or pool of servers, which may be located in one or more datacenters. The server(s) may also be connected to, or otherwise associated with one or more data storage devices (not shown). Generally, the AS(s) 130 offer applications or services that use IP/network resources. As examples, the server(s) may provide traffic management services, cloud computing services, content streaming services, immersive gaming experiences, social networking and/or microblogging services, one or more communication services (e.g., VoIP sessions, PTT sessions, group communication sessions, social networking services, etc.), and/or other like services for the UEs 101 via the CN 120.

The radio interface 103, 104 between the UE 101 and the RAN 110 is governed by the Radio Resource Control (RRC) protocol. RRC provides functions including, inter alia, RRC connection control, measurement configuration and reporting, among others. RRC connection control includes, inter alia, paging procedures, radio configuration control, and RRC connection establishment, modification, suspension, resumption, and release. During RRC connection establishment, the network (NW) may configure the UE 101 to perform measurement reporting or other like functions. RRC includes various UE 101 operating states including RRC_CONNECTED, RRC_INACTIVE, and RRC_IDLE. The UE 101 is in RRC_IDLE when no RRC connection is established, and the UE 101 is in RRC_CONNECTED or RRC_INACTIVE when a connection is established. The UE 101 in RRC_CONNECTED transfers unicast data; monitors control channels associated with the shared data channel to determine if data is scheduled for the UE 101; provides channel quality and feedback information; performs neighbor cell measurements and measurement reporting; and acquires system information (SI).

As mentioned previously, RRC connection control includes paging procedures, which are used by the NW (e.g., RAN 110 or CN 120) to transmit paging information to the UEs 101 when the UEs 101 are in RRC_IDLE or RRC_INACTIVE. In RRC_IDLE, the UE 101 monitors a paging channel (PCH) using 5G SAE Temporary Mobile Station Identifier (5G-S-TMSI) for paging initiated by the CN 120 ("CN paging" or "CN-initiated paging"). In RRC_INACTIVE, the UE 101 monitors the PCH using a full inactive Radio Network Temporary Identifier (fullI-RNTI) for paging initiated by the RAN 110 ("RAN paging" or "RAN-initiated paging"). The PCH is a transport channel used for transmission of Paging messages from the paging control channel (PCCH), which is a logical channel. The PCH supports discontinuous reception (DRX) to enable UE 101 power (e.g., battery) savings where the UE 101 wakes up to receive paging only at predefined time instants, which are referred to as paging occasions (POs).

The paging procedures allow the NW to reach the UEs 101 in RRC_IDLE and RRC_INACTIVE through Paging messages, and to notify the UEs 101 in RRC_IDLE, RRC_INACTIVE, and RRC_CONNECTED of SI changes and Public Warning System (PWS), Earthquake and Tsunami Warning System (ETWS), and/or Commercial Mobile Alert Service (CMAS) indications through Short Messages. Both Paging messages and Short Messages are addressed with Paging Radio Network Temporary Identifier (P-RNTI) on PDCCH (or P-RNTI over DCI (see e.g., clause 6.5 of 3GPP TS 38.331 v15.2.1 (2018-06))). Paging messages are sent on the PCCH, and Short Messages are sent directly over PDCCH. Short Messages can be transmitted on PDCCH using P-RNTI with or without an associated Paging message using a Short Message field in DCI format 1_0 (see e.g., 3GPP TS 38.212 15.2.0 (2018-06), clause 7.3.1.2.1). The Paging message is same for both RAN paging and CN paging.

The network initiates the paging procedure by transmitting a Paging message to the UE 101 during (or at) the UE's 101 PO as specified in 3GPP TS 38.304 v15.0.0 (2018-06). The NW may address multiple UEs 101 within a Paging message by including one PagingRecord for each UE 101 in the Paging message. When the UE 101 receives a Paging message while in RRC_IDLE, for each of the PagingRecord (if any) included in the Paging message, the UE 101 forwards the ue-Identity and accessType (if present) to the upper layers if the ue-Identity included in the PagingRecord matches the UE identity allocated by upper layers. UE procedures for receiving a Paging message while in RRC_INACTIVE is discussed in 3GPP TS 38.304 v15.0.0 (2018-06).

As mentioned previously, the UEs 101 need not monitor the PCH continuously, and instead a paging DRX is defined where the UEs 101 in RRC_IDLE or RRC_INACTIVE are only required to monitor the PCHs during one PO per DRX cycle (see e.g., 3GPP TS 38.304 v15.0.0 (2018-06)). The paging DRX cycle may be a default cycle for CN paging that is broadcast in SI, a UE-specific cycle for CN paging configured by Non-Access Stratum (NAS) signaling (e.g., originating from an AMF or MME), or a UE-specific cycle for RAN paging configured by RRC signaling. The UE 101 uses the paging DRX in RRC_IDLE and RRC_INACTIVE in order to reduce power consumption. The UE 101 monitors one PO per DRX cycle. As discussed in more detail infra, in various embodiments, the UE 101 may wake up (or initialize and/or powering on its RF circuitry) more than once per DRX cycle to further reduce power consumption.

A PO is a set of 'S' consecutive PDCCH monitoring occasions, where 'S' is the number of actual transmitted Synchronization Signal Blocks (SSBs) determined according to ssb-PositionsInBurst in SIB1. The $K^{th}$ PDCCH monitoring occasion for paging in the PO corresponds to the $K^{th}$ transmitted SSB. A PO can include multiple time slots (e.g., subframe or OFDM symbol) where a paging DCI can be sent to the UE 101 (see e.g., 3GPP TS 38.213 v15.2.0 (2018-06)). The PDCCH monitoring occasions for a PO can span one or multiple radio frames. One Paging Frame (PF) is one radio frame and may contain one or multiple PO(s) and/or a starting point of a PO. A PO associated with a PF may start in the PF or after the PF. In multi-beam operations, the length of one PO is one period of beam sweeping and the UE 101 can assume that the same Paging message is repeated in all beams of the sweeping pattern, and thus, the selection of the beam(s) for the reception of the Paging message is up to UE 101 implementation. In multi-beam operations, the UE 101 assumes that the same Paging message and the same Short Message are repeated in all transmitted beams, and thus, the selection of the beam(s) for the reception of the Paging message and Short Message is up to UE implementation. The PF and PO are determined as described in 3GPP TS 38.304 v15.0.0 (2018-06). The PDCCH monitoring occasions for paging are determined according to pagingSearchSpace as specified in 3GPP TS 38.213 v15.2.0 (2018-06) and firstPDCCH-MonitoringOccasionOfPO if configured as specified in TS 38.331 v15.2.1 (2018-06). Other aspects of PDCCH monitoring occasions are discussed in 3GPP TS 38.304 v15.0.0 (2018-06).

For Short Message reception in a PO, the UE 101 monitors PDCCH monitoring occasion(s) for paging as specified in 3GPP TS 38.304 v15.0.0 (2018-06) and 3GPP TS 38.213 v15.2.0 (2018-06). UEs 101 in RRC_IDLE and/or RRC_INACTIVE monitor for Short Messages (e.g., SI change indications or PWS indications) in their own POs every DRX cycle. UEs 101 in RRC_CONNECTED monitor for ShortMessages in any PO at least once per modification period (e.g., for SI change indications) or at least once every defaultPagingCycle (e.g., for PWS indications) if the UE 101 is provided with common search space on the active Bandwidth Part (BWP) to monitor paging (see e.g., 3GPP TS 38.213 v15.2.0 (2018-06), clause 13).

UEs 101 in RRC_INACTIVE and RRC_IDLE also perform neighbor cell measurements and cell (re-)selection, among other functions. Cell selection involves "camping on a cell" wherein the UE 101 searches for a suitable cell, selects the suitable cell to provide available services, and monitors for the control channel of the suitable cell. The cell selection process takes place as described in 3GPP TS 38.304 v15.0.0 (2018-06). Cell reselection involves the UE 101 finding a more suitable cell according to cell reselection criteria, and reselecting and camping on the more suitable cell. When the UE 101 is in either CampedNormally state or Camped on Any Cell state on a cell, the UE 101 attempts to detect, synchronize, and monitor intra-frequency, inter-frequency, and inter-RAT cells indicated by the serving cell. UE 101 measurement activity is also controlled by measurement rules defined in 3GPP TS 38.304 v15.0.0 (2018-06), allowing the UE 101 to limit its measurement activity. For cell reselection purposes, the UE 101 is capable of monitoring at least one intra-frequency carrier, at least 7 NR inter-frequency carriers (depending on UE capability), at least 7 FDD E-UTRA inter-RAT carriers (depending on UE capability), and at least 7 TDD E-UTRA inter-RAT carriers (depending on UE capability). In addition, if the UE 101 supports E-UTRA measurements in RRC_IDLE state, the UE 101 is capable of monitoring a total of at least 14 carrier frequency layers, which includes serving layer, comprising of any combination of the aforementioned E-UTRA FDD, E-UTRA TDD, and NR layers.

A "measurement" is an SSB based intra-frequency measurement provided the center frequency of the SSB of the serving cell indicated for measurement and the center frequency of the SSB of the neighbor cell are the same, and the subcarrier spacing of the two SSBs are also the same. An SSB is a Synchronization Signal (SS)/PBCH block including a PSS, SSS, and PBCH. A measurement may be an SSB based inter-frequency measurement that is not an intra-frequency measurement. The UE 101 identifies new intra-frequency cells (or inter-frequency cells) and performs Synchronization Signal based Reference Signal Received Power (SS-RSRP), Synchronization Signal based Reference Signal Received Quality (SS-RSRQ), and Synchronization Signal based Signal to Noise and Interference Ratio (SS-SINR) measurements of identified intra-frequency cells (or inter-frequency cells) if carrier frequency information is provided by a Primary Cell (PCell), a Secondary Cell (SCell), or a Primary SCell (PSCell), even if no explicit neighbor list with physical layer cell identities is provided. SSB based measurements are configured along with one or two measurement timing configuration(s) (e.g., SSB-based Measurement Timing Configuration (SMTC)), which provides periodicity, duration, and offset information on a window of up to 5 ms where the measurements are to be performed. The SMTC is an SSB-based measurement timing configuration configured by SSB-MeasurementTimingConfiguration. A single measurement window offset and measurement duration are configured per intra-frequency measurement object. For inter-frequency measurements, one measurement window periodicity may be configured per inter-frequency measurement object. For SSB based measurements, one measurement object corresponds to one SSB and the UE 101 considers different SSBs to be different cells.

As mentioned previously, the UE 101 in RRC_IDLE only needs to monitor for Paging messages during one DRX cycle, which reduces UE power consumption (e.g., in terms of battery charge of the UE's 101 battery and/or in terms of thermal energy produced by the UE's 101 RF circuitry). In LTE implementations, UEs 101 could receive Paging messages and perform cell-specific reference signal (CRS)-based measurements at the same time within one DRX cycle. This is advantageous in terms of UE power consumption because the UE 101 only needs to wake up once in one DRX cycle. The paging cycle in NR takes the default DRX cycle parameter in LTE as baseline. Furthermore, to provide multiple SSBs and POs based on a default association or a non-default association, the NW can configure a PO with respect to an SSB of the serving cell in an Time Division Multiplexing (TDM) manner or in an Frequency Division Multiplexing (FDM) manner for RRC_INACTIVE and RRC_IDLE. Considering the various PO configurations (e.g., for both TDM and FDM), PO collisions may negatively impact UE 101 power consumption for paging, and negatively impact measurement performance. Embodiments herein address impacts on UE 101 power consumption for paging, and impacts on UE 101 measurement requirements for cell reselection in RRC_IDLE.

Figure 7:
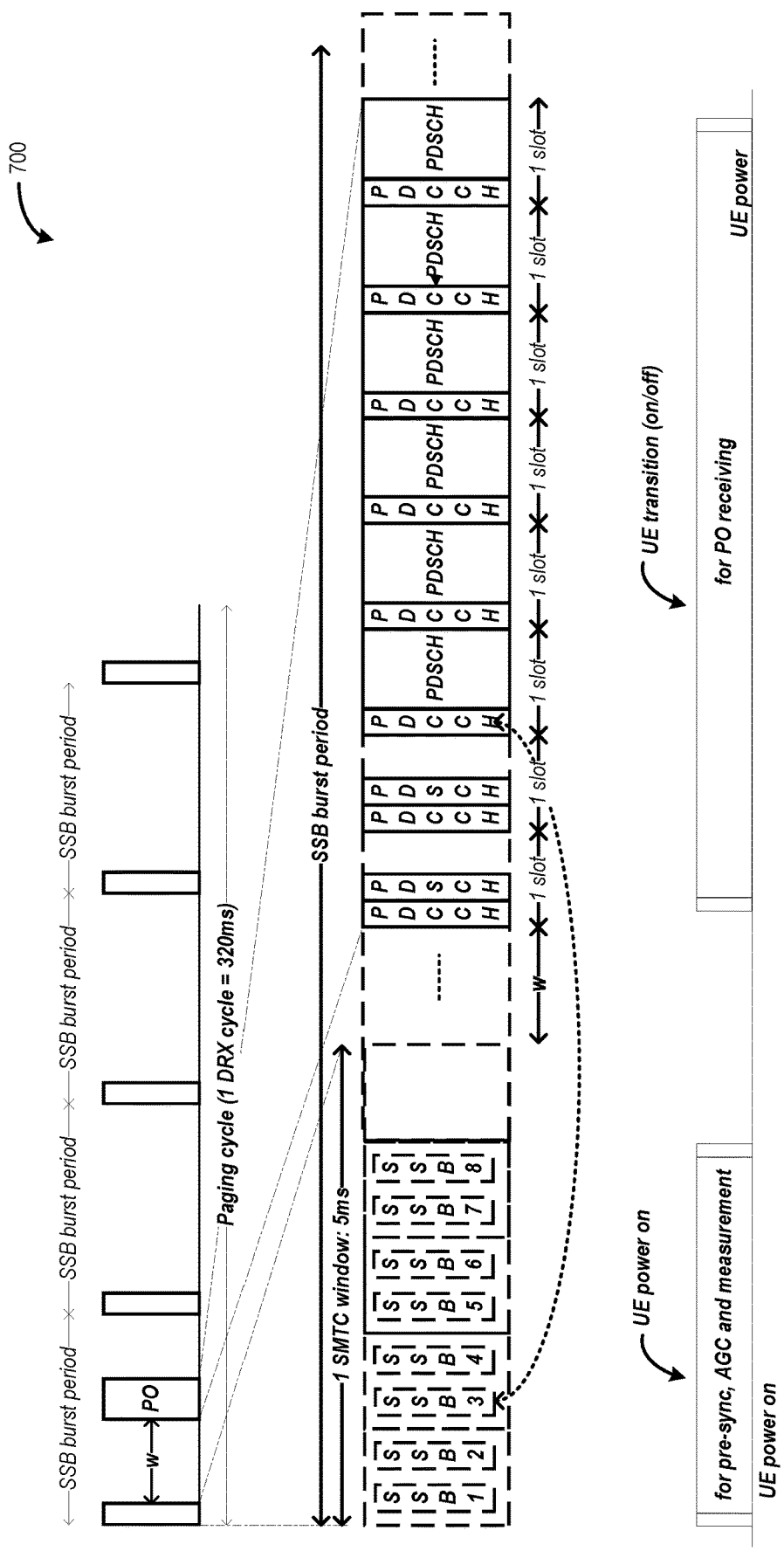
FIG. 7 shows a scenario in which PO is TDMed with SSB with respect to embodiments of the present disclosure.

For example, and with reference to FIG. 7 showing and describing a scenario 700 in which PO is TDMed with SSB with respect to embodiments of the present disclosure, when the PO is TDMed with an SSB, transmission of the SSB and PO take place during an SSB burst period. FIG. 7 described with respect to embodiments of the present disclosure. In NR implementations, an SSB burst periodicity can be {5, 10, 20, 40, 80, 160} ms, and the SSB burst may be transmitted in the first or second half of a radio frame, as indicated in a Master Information Block (MIB). The SSB burst period includes an SMTC window and a corresponding (follow-up) PO with a time gap w between the SMTC window and the corresponding PO. Each SMTC window includes a plurality of SSBs, wherein a K-th monitoring occasion in a PO corresponds to a K-th transmitted SSB. The association between the actually transmitted SSB and the PDCCH monitoring occasion may be configured by the NW. Because there may be various PO configurations, PO collision may take place, which may impact UE power consumption for monitoring and receiving Paging messages. Generally, a gNB 111 cannot always guarantee to schedule a PO immediately after a quasi-co-located (QCLed) SSB to every UE 101, especially when there are a relatively large number of UEs 101 served by the gNB 111 that are receiving different Paging messages. The PO for each UE 101 may be UE-specific, and therefore, the frequency/time multiplexed for the PO may also be UE-specific. As a result, the time gap w between reception/measurement of the SSB and a subsequent follow-up PO can be as long as an SSB burst period. Therefore, in these cases, the UE 101 power-on duration takes place for both the PO and SSB.

In particular, the AGC and pre-synchronization (sync) before the PO is necessary in realistic implementations, because without the correct AGC settings Paging message reception is not reliable. For example, in LTE the power on time for PO in a paging cycle can be longer than the time of the PO subframe (e.g., this may extend the PO by at least approximately 1 Time Transmission Interval (TTI)). For paging reception in NR implementations, the UE 101 needs to power on its RF chain earlier than the PO for fine timing adjustments and AGC to guarantee robust paging receiving. In these situations, the UE 101 powers on its RF circuitry for pre-sync, AGC, and measurement performance, as well as for PO reception. Therefore, in order to acquire the fine timing and proper AGC for successful Paging message reception, UEs 101 in RRC_IDLE need to power on during the SMTC window before a corresponding PO.

Figure 8:
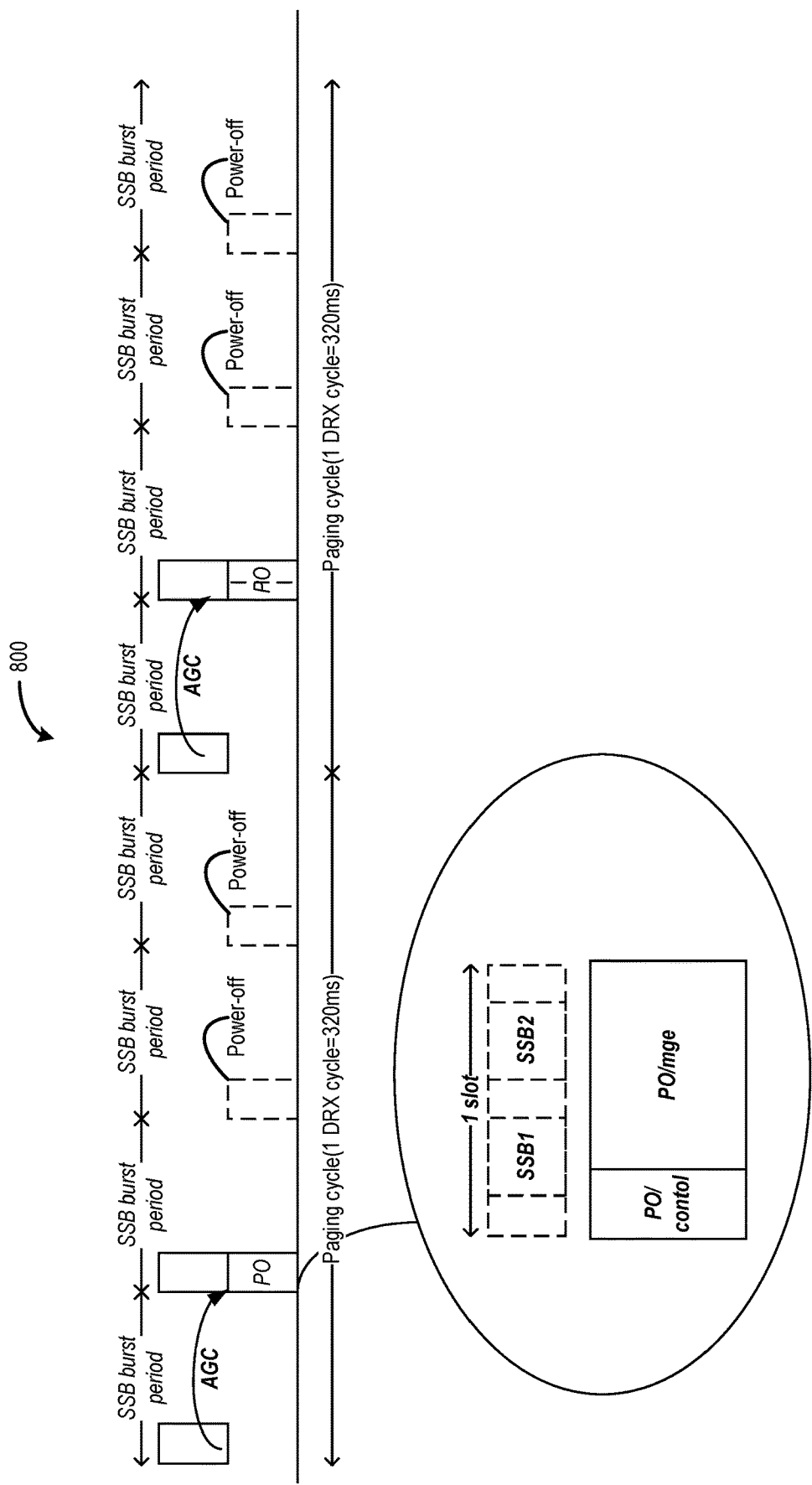
FIG. 8 shows a scenario in which PO is FDMed with SSB with respect to embodiments of the present disclosure.

However, this extended power-on duration may result in additional UE power consumption since more than one wake-up takes place during the paging cycle. Since one PO comprises 'S' PDCCH monitoring occasions (where 'S' is equal to the number of actual transmitted SSBs), the UE 101 power-on window for pre-sync and AGC estimation can include "S*0.5 slot" (where each SSB can be less than 0.5 slot) and uncertainty. Unlike RRC_IDLE in LTE implementations, the UE 101 activation time for both SSB and PO within a paging cycle may not be contiguous, which can reduce the power consumption greatly especially when the time gap w is too long. Thus, the UE 101 power-on duration for the robust paging reception in NR RRC_IDLE may need about "1*SMTC_period+4*$T_{transition\_onAndoff}$" besides the PO ("S*slot") itself. $T_{transition\_onAndoff}$ is the UE 101 transition time between turning the RF chain power on and turning the RF chain power off. On the other hand, if the interval between two consecutive SSBs and POs is large enough, the AGC gain from the previous SSB can be expired. Regarding the similar AGC approach for the inter-frequency measurement in LTE, AGC gain could be expired within a measurement gap (e.g., 160 ms). At the same time, the maximum time gap between a PO and the closest SSB ahead is less than an SSB burst period, which is configurable as one of {5,10,20,40,80,160} ms. Therefore, the maximum possible time gap between a TDMed PO and SSB is not larger than an SSB burst period. That is, the AGC gain based on the adjacent SSB usually works well for the PO within a DRX cycle Referring now to FIG. 8 showing and describing a scenario 800 in which PO is FDMed with SSB with respect to embodiments of the present disclosure, when the PO is FDMed with an SSB, the FDMed SSB and PO are aligned with the subframe (slot) boundary, it is not feasible to obtain the AGC and timing from the SSB FDMed in a same SSB burst set. That is, regardless its capability of simultaneous SSB and PO reception in case of FDMed SSB and PO, the UE 101 may need to wake up earlier than the PO for SSB AGC. Therefore, for FDMed SSB and PO, within a paging/DRX cycle, additional UE 101 wake ups beside PO may be desirable. If there are other UE 101 wake ups other than during the PO, the UE 101 power consumption may be the same or similar to the power consumption issues for the TDM case as discussed previously. Similarly, for realistic implementations, the power consumption increases brought by the additional UE 101 wake ups for AGC and measurement during the paging cycle can be acceptable. Other constraints on the gap between the previous SSB and PO is expected to guarantee a valid AGC. Regarding this interval, when the FDMed SSB and PO depends on the SSB burst period, and the maximum SSB burst period is 160 ms, then the AGC gain based on the closest SSB before PO can be valid in a paging cycle for FDMed PO and SSB. In order to conserve UE 101 power consumption and to improve UE 101 measurement performance, embodiments herein provide that the UE 101 may wake up more than once during a paging or DRX cycle for successful paging reception.

Figure 9:
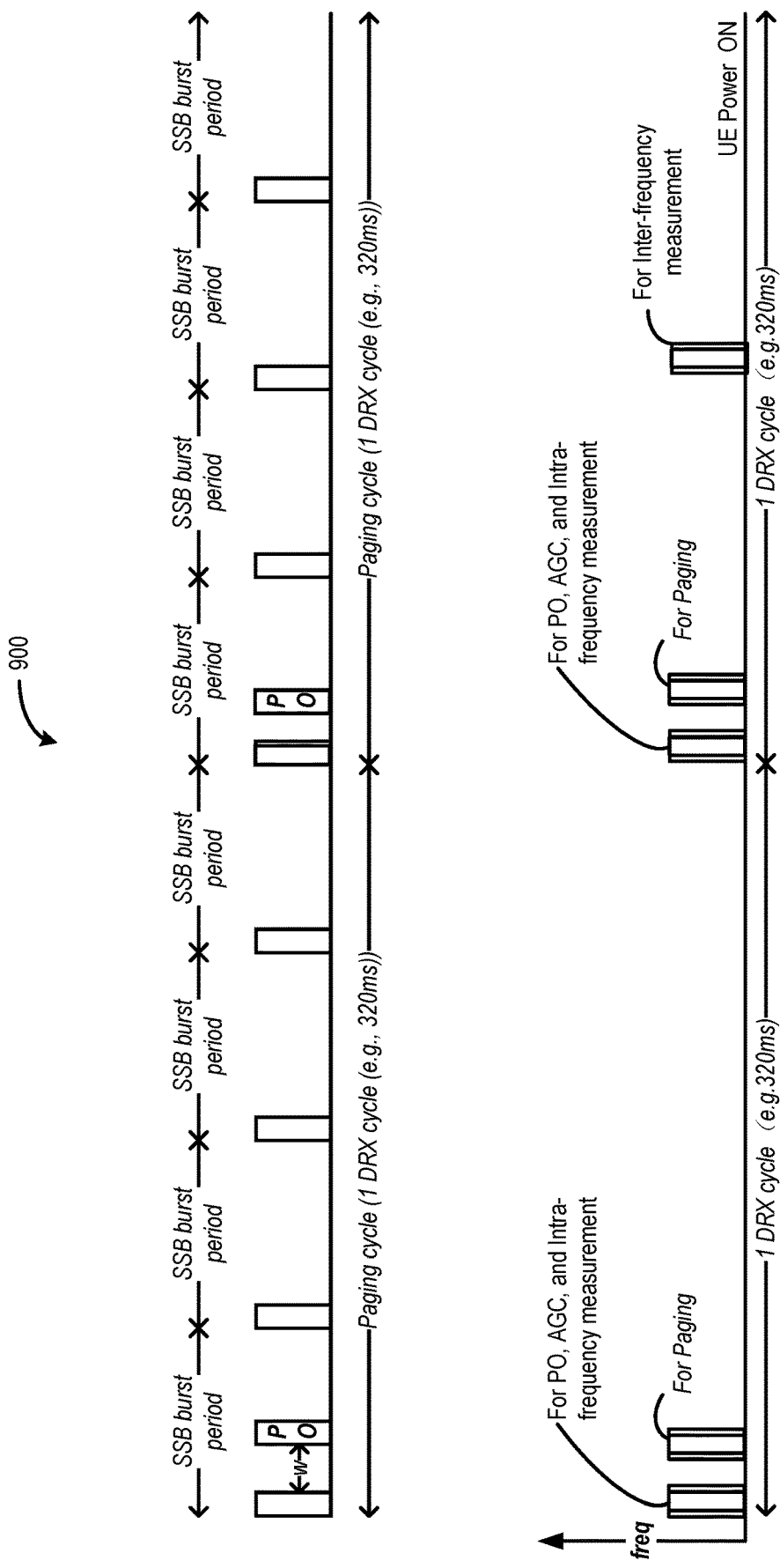
FIG. 9 shows an idle mode measurement scenario with respect to embodiments of the present disclosure.

Referring now to FIG. 9 showing and describing a scenario 900 in which measurements in idle mode take place with respect to embodiments of the present disclosure, with respect to serving cell and intra/inter-frequency cell measurements, since the UE 101 needs to wake up in an SMTC window for AGC and PO, SSBs in the SMTC window can be available for serving cell and intra-frequency measurement every a DRX cycle without any other extension of UE power-on duration for paging. This allows the UE 101 to perform serving cell and intra-frequency measurements every a DRX cycle. However, since the UE 101 needs retune to other frequency carriers for inter-frequency measurement, the UE 101 may need extra power-on duration so that SSBs of the inter-frequency neighbor cells can be received. This means that the UE 101 may perform inter-frequency measurements every two DRX cycles. In comparison with the intra-frequency measurement, the UE 101 needs to wake up one more time for inter-frequency measurements, and the transition time for RF chain power on/off and retuning can be a little bit longer than the that for power on/off only (e.g., 0.5 ms vs 0.2 ms). Therefore, inter-frequency measurement may further increase UE 101 power consumption.

According to various embodiments, in case of potential PO and SSB collision, the UE 101 wakes up more than once during a DRX cycle for successful paging reception and cell (re)selection measurements, which should have little to no impact on overall/total UE power consumption. In these embodiments, the UE 101 includes two power-on (or wake up) windows during which the UE 101 (or the UE's 101 RF circuitry) wakes up or powers on during the DRX cycle. The power-on (or wake up) windows include an SSB power-on window for SSB reception/measurement and a PO power-on window for Paging message reception. In some embodiments, the SSB power-on window can be used for Automatic Gain Control (AGC) and pre-synchronization (sync) for paging. In some embodiments, the SSB power-on window can be used for serving cell measurement, intra-frequency cell measurements, or inter-frequency cell measurements. When the SSB power-on window is used for serving cell measurements or for intra-frequency cell measurements, the UE 101 may perform the serving cell measurements or intra-frequency cell measurements once per DRX cycle. In these embodiments, the UE 101 may perform the serving cell measurements or intra-frequency cell measurements as follows.

For measurement and evaluation of serving cells, the UE 101 measures the SS-RSRP and SS-RSRQ level of the serving cell, and evaluates the cell selection criterion S defined in 3GPP TS 38.304 v15.0.0 (2018-06) for the serving cell at least once every M1*N1 DRX cycle, where M1=2 if the SMTC periodicity ($T_{SMTC}$)>20 ms and DRX cycle≤0.64 seconds, otherwise M1=1; and N1 is a scaling factor. The cell selection criterion S should not be confused with the set of 'S' consecutive PDCCH monitoring occasions in a PO. If the UE 101 has evaluated, according to table 1(a) or table 1(b), in $N_{serv}$ consecutive DRX cycles that the serving cell does not fulfill the cell selection criterion S, the UE 101 initiates the measurements of all neighbor cells indicated by the serving cell, regardless of the measurement rules currently limiting UE measurement activities. If the UE 101 in RRC_IDLE has not found any new suitable cell based on searches and measurements using the intra-frequency, inter-frequency, and inter-RAT information indicated in the SI for 10 seconds (s), the UE 101 initiates cell selection procedures for the selected PLMN as discussed in 3GPP TS 38.304 v15.0.0 (2018-06). Other aspects of serving cell measurements are discussed in 3GPP TS 38.133 v15.2.0 (2018-07).

TABLE 1(a)

| | $N_{serv}$ |
| --- | --- |
| DRX cycle length [s] | $N_{serv}$ [number of DRX cycles] |
| 0.32 | 4 |
| 0.64 | 4 |
| 1.28 | 2 |
| 2.56 | 2 |

TABLE 1(b)

| | $N_{serv}$ | | |
| --- | --- | --- | --- |
| DRX cycle | Scaling Factor (N1) | | $N_{serv}$ |
| length [s] | FR1 | FR2[Note1] | [number of DRX cycles] |
| 0.32 | 1 | 8 | M1 * N1 * 4 |
| 0.64 | | 5 | M1 * N1 * 4 |
| 1.28 | | 4 | N1 * 2 |
| 2.56 | | 3 | N1 * 2 |

[Note1] Applies for UE supporting power class 2&3&4. For UE supporting power class 1, N1 = 8 for all DRX cycle length.

For intra-frequency cell measurements, the UE 101 identifies new intra-frequency cells and performs SS-RSRP and SS-RSRQ measurements of the identified intra-frequency cells without an explicit intra-frequency neighbor list containing physical layer cell identities. The UE 101 evaluates whether a newly detectable intra-frequency cell meets the reselection criteria defined in 3GPP TS 38.304 v15.0.0 (2018-06) within $T_{detect,NR\_Intra}$ when that $T_{reselection}=0$. An intra-frequency cell is considered to be detectable according to the conditions defined in Annex B.1.2 of 3GPP TS 38.133 v15.2.0 (2018-07) for a corresponding band. The UE 101 measures SS-RSRP and SS-RSRQ at least every $T_{measure,NR\_Intra}$ (see e.g., table 2(a) and/or table 2(b)) for intra-frequency cells that are identified and measured according to the measurement rules. Other aspects of intra-frequency cell measurements are discussed in 3GPP TS 38.133 v15.2.0 (2018-07).

TABLE 2(a)

$T_{detect,NR\_Intra}$, $T_{measure,NR\_Intra}$ and $T_{evaluate,NR\_intra}$

| DRX cycle length [s] | $T_{detect,NR\_Intra}$ [s] (number of DRX cycles) | $T_{measure,NR\_Intra}$ [s] (number of DRX cycles) | $T_{evaluate,NR\_intra}$ [s] (number of DRX cycles) |
| --- | --- | --- | --- |
| 0.32 | 11.52 × N1 [36 × N1] | 1.28 × N1 (4 × N1) | 5.12 × N1 (16 × N1) |
| 0.64 | 17.92 × N1 [28 × N1] | 1.28 × N1 (2 × N1) | 5.12 × N1 (8 × N1) |
| 1.28 | 32 × N1 [25 × N1] | 1.28 × N1 (1 × N1) | 6.4 × N1 (5 × N1) |
| 2.56 | 33.28 × N1 [23 × N1] | 2.56 × N1 (1 × N1) | 7.68 × N1 (3 × N1) |

NOTE[1] N1 = [TBD] for frequency range FR2, and N1 = 1 for frequency range FR1.

TABLE 2(b)

$T_{detect,NR\_Intra}$, $T_{measure,NR\_Intra}$ and $T_{evaluate,NR\_Intra}$

| DRX cycle length [s] | Scaling Factor (N1) FR1 | Scaling Factor (N1) FR2[Note1] | $T_{detect,NR\_Intra}$ [s] (number of DRX cycles) | $T_{measure,NR\_Intra}$ [s] (number of DRX cycles) | $T_{evaluate,NR\_Intra}$ [s] (number of DRX cycles) |
| --- | --- | --- | --- | --- | --- |
| 0.32 | 1 | 8 | 11.52 × N1 × M2 (36 × N1 × M2) | 1.28 × N1 × M2 (4 × N1 × M2) | 5.12 × N1 × M2 (16 × N1 × M2) |
| 0.64 | | 5 | 17.92 × N1 (28 × N1) | 1.28 × N1 (2 × N1) | 5.12 × N1 (8 × N1) |
| 1.28 | | 4 | 32 × N1 (25 × N1) | 1.28 × N1 (1 × N1) | 6.4 × N1 (5 × N1) |
| 2.56 | | 3 | 58.88 × N1 (23 × N1) | 2.56 × N1 (1 × N1) | 7.68 × N1 (3 × N1) |

Note[1] Applies for UE supporting power class 2&3&4. For UE supporting power class 1, N1 = 8 for all DRX cycle length.
Note 2:
M2 = 1.5 if SMTC periodicity of measured intra-frequency cell > 20 ms; otherwise M2 = 1.

As mentioned previously, the UE 101 may wake up an additional time for inter-frequency measurements in some embodiments (e.g., when the SSB power-on window is to be used for inter-frequency cell measurements). In these embodiments, the transition time for RF chain power on/off and retuning can be a little bit longer than the that for power on/off only (e.g., 0.5 ms vs 0.2 ms). This means that inter-frequency measurements will likely increase UE power consumption in comparison to power consumption used for serving cell and intra-frequency measurements. Therefore, in embodiments where the SSB power-on window is used for inter-frequency cell measurements, the inter-frequency cell measurement requirements can be relaxed since the measurement interval is not a single DRX.

In order to achieve a better trade-off between power consumption and mobility performance, in various embodiments, the UE 101 does not need to measure the inter-frequency cells every DRX cycle when the DRX cycle is less than 320 ms. In these embodiments, the inter-frequency measurement requirements for NR RRC_IDLE mode cell reselection specified for DRX cycles are relaxed for UE power savings. In various embodiments, the inter-frequency measurement requirements are relaxed by a scaling factor (e.g., N1 in table 3(a) or table 3(b)) when the DRX cycle is less than or equal to 320 ms (e.g., DRX_cycle<=[320] ms). In embodiments, the DRX cycle can have various lengths. In one example, the scaling factor (N1) is 1.5 when the DRX cycle is less than or equal to 320 ms. In another example, the scaling factor for FR2 cell reselection requirements can be up to 8. In this latter example, the $T_{detect}$ time is scaled for FR2 since Rx beam sweeping is applicable. In order to limited the total delay of cell reselection, we would like to use the same number for RX beams sweeping as that of FR2 cell identification requirement 8.

For measurements of inter-frequency NR cells, the UE 101 identifies new inter-frequency cells and performs SS-RSRP or SS-RSRQ measurements of identified inter-frequency cells if carrier frequency information is provided by the serving cell, even if no explicit neighbor list with physical layer cell identities is provided. The UE 101 searches every layer of higher priority at least every $T_{higher\_priority\_search} = ([60]*N_{layers})$ seconds, where $N_{layers}$ is the total number of higher priority NR and E-UTRA carrier frequencies broadcasted in SI. The UE 101 evaluates whether a newly detectable inter-frequency cell meets the reselection criteria defined in 3GPP TS 38.304 v15.0.0 (2018-06) within $K_{carrier}*T_{detect,NR\_Inter}$ if at least carrier frequency information is provided for inter-frequency neighbor cells by the serving cells when $T_{reselection}=0$ provided that the reselection criteria is met by a margin of at least [5] dB in FR1 or [6.5] dB in FR2 for reselections based on ranking or [6] dB in FR1 or [7.5] dB in FR2 for SS-RSRP reselections based on absolute priorities or [4] dB in FR1 and [4] dB in FR2 for SS-RSRQ reselections based on absolute priorities. The parameter $K_{carrier}$ is the number of NR inter-frequency carriers indicated by the serving cell. An inter-frequency cell is considered to be detectable according to the conditions defined in Annex B.1.3 of 3GPP TS 38.133 v15.2.0 (2018-07) for a corresponding band. The UE 101 measures SS-RSRP or SS-RSRQ at least every $K_{carrier}*T_{measure,NR\_Inter}$ (see e.g., table 3(a) or table 3(b)) for identified lower or equal priority inter-frequency cells. If $T_{reselection}$ timer has a non-zero value and the inter-frequency cell is satisfied with the reselection criteria, the UE 101 evaluates this inter-frequency cell for the $T_{reselection}$ time. If this cell remains satisfied with the reselection criteria within this duration, then the UE 101 reselects that cell. The UE 101 is not expected to meet the measurement requirements for an inter-frequency carrier under DRX cycle=320 ms defined in tables 3(a) or 3(b) under the conditions discussed in 3GPP TS 38.133 v15.2.0 (2018-07)).

TABLE 3(a)

$T_{detect,NR\_Inter}$, $T_{measure,NR\_Inter}$ and $T_{evaluate,NR\_Inter}$

| DRX cycle length [s] | $T_{detect,NR\_Intra}$ [s] (number of DRX cycles) | $T_{measure,NR\_Intra}$ [s] (number of DRX cycles) | $T_{evaluate,NR\_intra}$ [s] (number of DRX cycles) |
| --- | --- | --- | --- |
| 0.32 | 11.52 × N1 [36 × N1] | 1.28 × N1 (4 × N1) | 5.12 × N1 (16 × N1) |
| 0.64 | 17.92 × N1 [28 × N1] | 1.28 × N1 (2 × N1) | 5.12 × N1 (8 × N1) |
| 1.28 | 32 × N1 [25 × N1] | 1.28 × N1 (1 × N1) | 6.4 × N1 (5 × N1) |
| 2.56 | 58.88 × N1 [23 × N1] | 2.56 × N1 (1 × N1) | 7.68 × N1 (3 × N1) |

NOTE[1] N1 = [TBD] for frequency range FR2, and N1 = 1 for frequency range FR1.

TABLE 3(b)

$T_{detect\_NR\_Inter}$, $T_{measure\_NR\_Inter}$ and $T_{evaluate\_NR\_Inter}$

| DRX cycle length [s] | Scaling Factor (N1) | | $T_{detect\_NR\_Inter}$ [s] (number of DRX cycles) | $T_{measure\_NR\_Inter}$ [s] (number of DRX cycles) | $T_{evaluate\_NR\_Inter}$ [s] (number of DRX cycles) |
|---|---|---|---|---|---|
| | FR1 | FR2[Note1] | | | |
| 0.32 | 1 | 8 | 11.52 × N1 × 1.5 (36 × N1 × 1.5) | 1.28 × N1 × 1.5 (4 × N1 × 1.5) | 5.12 × N1 × 1.5 (16 × N1 × 1.5) |
| 0.64 | | 5 | 17.92 × N1 (28 × N1) | 1.28 × N1 (2 × N1) | 5.12 × N1 (8 × N1) |
| 1.28 | | 4 | 32 × N1 (25 × N1) | 1.28 × N1 (1 × N1) | 6.4 × N1 (5 × N1) |
| 2.56 | | 3 | 58.88 × N1 (23 × N1) | 2.56 × N1 (1 × N1) | 7.68 × N1 (3 × N1) |

[Note1] Applies for UE supporting power class 2&3&4. For UE supporting power class 1, N1 = 8 for all DRX cycle length.

Figure 2:
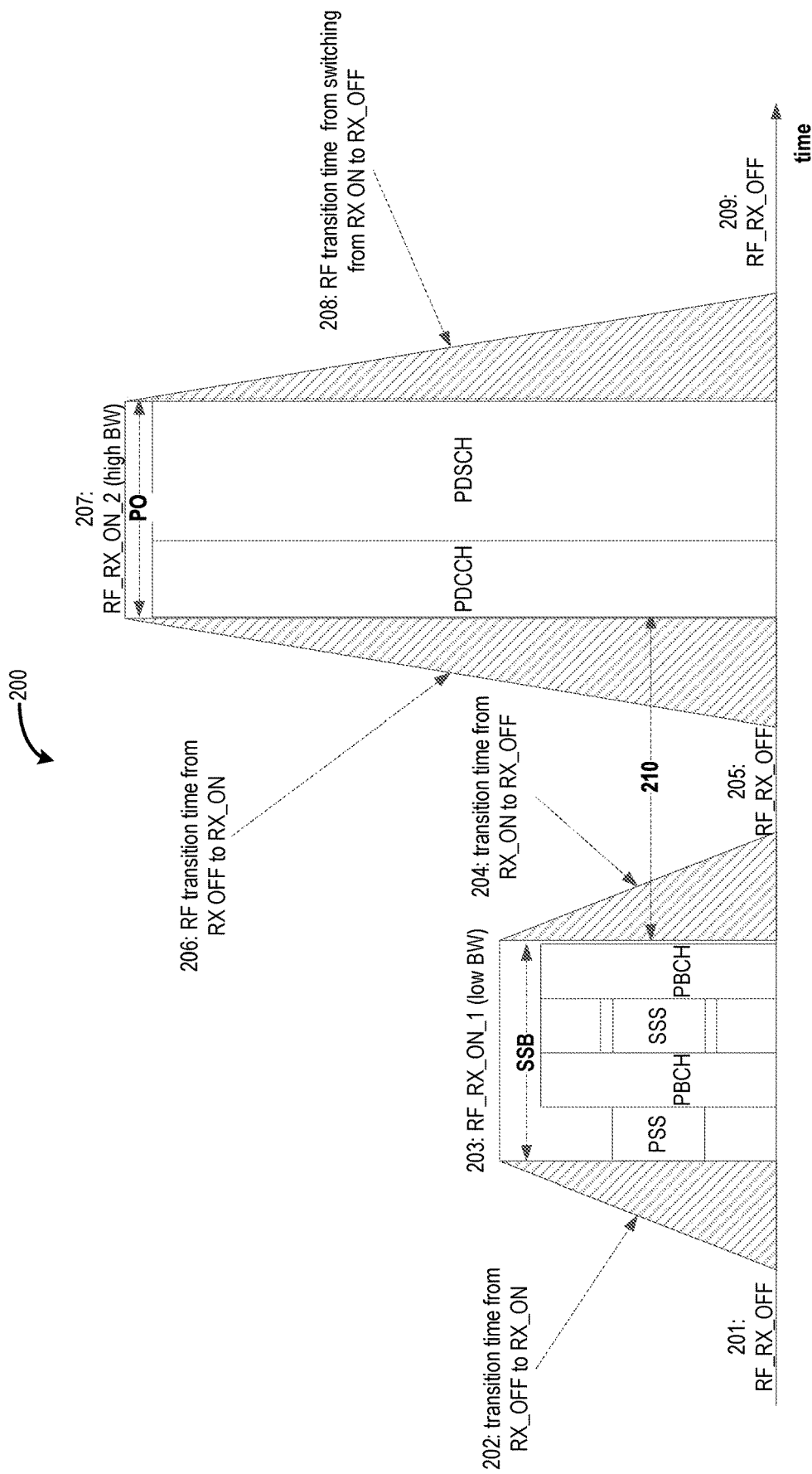
FIG. 2 illustrates an example receiver (Rx) warm-up overhead reduction embodiment that uses opportunistic on-duration split with adaptive Rx switching pattern.

FIG. 2 illustrates an example graph 200 showing SSB warm-up overhead reduction by opportunistic on-duration separation with adaptive Rx switching pattern, according to various embodiments. The graph 200 shows the ON and OFF state transitions of an Rx RF chain or RF circuitry of the UE 101 for receiving/measuring an SSB and a PO. In this example, SSB and PO may be TDMed or FDMed as discussed previously, and/or the SSB may be QCLed with the PO.

In FIG. 2, the RF circuitry is first in the OFF state for a period of time 201 (e.g., "RF_RX_OFF" in FIG. 2), and then transitions to the ON state during a transition time 202 (also referred to as an "SSB warm-up 202," "SSB warm-up period 202," or the like) to receive and/or measure an SSB. The RF circuitry remains in the ON state for the duration of the SSB reception period 203 (e.g., "RF_RX_ON_1 (low BW)" in FIG. 2). The SSB includes a PSS, SSS, and PBCH. After reception/measure of the SSB, the RF circuitry transitions to the OFF state during a transition time 204 (also referred to as an "SSB cool-down 204," "SSB cool-down period 204," or the like). The RF circuitry remains in the OFF state for a period of time 205 (e.g., "RF_RX_OFF" in FIG. 2), and then transitions back to the ON state during a transition time 206 (also referred to as a "PO warm-up 206," "PO warm-up period 206," or the like) to receive a PDCCH and PDSCH during the PO. The RF circuitry remains in the ON state for the duration of the PO reception period 207 (e.g., as indicated by "RF_RX_ON_2 (high BW)" in FIG. 2), transitions to the OFF state during a transition time 208 (also referred to as a "PO cool-down 208," "PO cool-down period 208," or the like) after the PO reception period 207, and remains in the OFF state for another period of time 209.

In the example of FIG. 2, the SSB reception period 203 and the PO period 207 are separated by the SSB-PO time gap 210 (also referred to as a "long time gap 210" or the like) during which the RF circuitry of the UE 101 is turned off or muted. Turning off the RF circuitry during the SSB-PO time gap 210 allows the UE 101 to conserve power. In this embodiment, the UE 101 compares the time gap length of the SSB warm-up 202 (e.g., for receiving the SSB that is QCLed with the PO) and the allocated PO with a predefined or configured threshold. In some implementations, the QCL information and SSB-PO time gap length information can be derived by the UE 101 from RRC configurations obtained while in RRC_CONNECTED mode before entering RRC_IDLE mode. In one example, the threshold is the sum of the transition time required by the RF circuitry to switch from the OFF state to the ON state (e.g., SSB warm-up period 202 and/or PO warm-up period 206) plus the transition time required by the RF circuitry to switch from the ON state to the OFF state (e.g., SSB cool-down period 204 and/or PO cool-down period 208). These time periods can be measured during experimentation prior to commercial release of the UE 101. When the time gap is higher (or greater) than the threshold, the UE 101 can separate the ON state durations into two dis-contiguous portions including one portion 203 for SSB reception and another portion 207 for PO reception. In the example of FIG. 2, the SSB-PO time gap 210 is longer than the RF transition times, and therefore, the ON-durations 203 and 207 are split using adaptive Rx switching. Considering that the SSB has a much narrower BW than the BW of the PO, which includes PDCCH and PDSCH, in some embodiments, the UE 101 can allocate different Rx BWs as well as the Rx central carrier frequencies within the RF circuitry for SSB reception and for PO reception in the separated portions 203 and 207. This results in much shorter ON duration and optimized RF BW settings than those used for conventional SSB/PO Rx schemes.

In some of the aforementioned embodiments, the UE's 101 RF chain for target cells in other frequency ranges (FRs) are separated. In such embodiments, the RF chain for target cells in another FR can be kept power-on from the last measurement during the duration of a specific timer (e.g., $T_{reselection}$, $T_{detect}$_NR_Inter, $T_{measure\_NR\_Inter}$, $T_{evaluate\_NR\_Inter}$, or some other timer). In these embodiments, the UE 101 can trigger the specific timer when the measurement results (in decibels (dB)) are higher than a predefined threshold. In some embodiments, a value of the timer can be larger than an handover (HO) preparation time. In some embodiments, when the UE 101 is executing an inter-frequency HO, no processing on the RF chain of FR2 and cell searching may be performed. These and other embodiments are discussed in more detail infra Referring now to FIGS. 3 and 4, which depict embodiments for further reducing RF circuitry warm-up overhead by adaptive SSB reference symbol down-selection. In these embodiments, a subset of reference symbols within the SSB (heterogeneous) are opportunistically skipped during the warm-up when the related channel Key Performance Indicators (KPIs) have a relatively high error margin. Here, the "skipping" involves the UE 101 disabling or muting the reception/measurement of certain SSB symbols. An SSB includes three types of reference symbols including PSS, SSS, and PBCH-DMRS, where the UE 101 assumes that reception occasions of the PSS, SSS, and PBCH take place in consecutive symbols. Due to the different nature of the waveforms and the different types of reference symbols, results in different capabilities for tracking different channel parameters in different conditions. For example, PSS and SSS have much better capability to track timing drifts with higher timing uncertainties than DMRS because PSS and SSS have a much higher density reference subcarrier allocation than DMRS. For example, DMRS based measurements are much more robust against colliding interferences than the PSS because the PSS has only three alternative preamble sequences (which are determined by modulo-3 value of the physical cell ID). When a neighboring cell SSB with the same PSS sequence is time and frequency colliding with the warm up SSB, the PSS may not be used for the warm-up measurement (e.g., RSRP measurement, AGC measurement, or fine timing offset measurement). Therefore, in these embodiments the UE 101 adaptively down-selects the best suitable reference symbols within an SSB for the DRX warm-up processing. In some embodiments, the down-selection may be based on run-time channel conditions. In some embodiments, when the time gap between an SSB and a QCLed PO is too short so that they cannot be split into dis-contiguous portions (as in the example of FIG. 2 discussed previously), skipping the ending symbols within the SSB can relax the time gap and can make the split possible. This further results in bandwidth overhead reduction.

Figure 3:
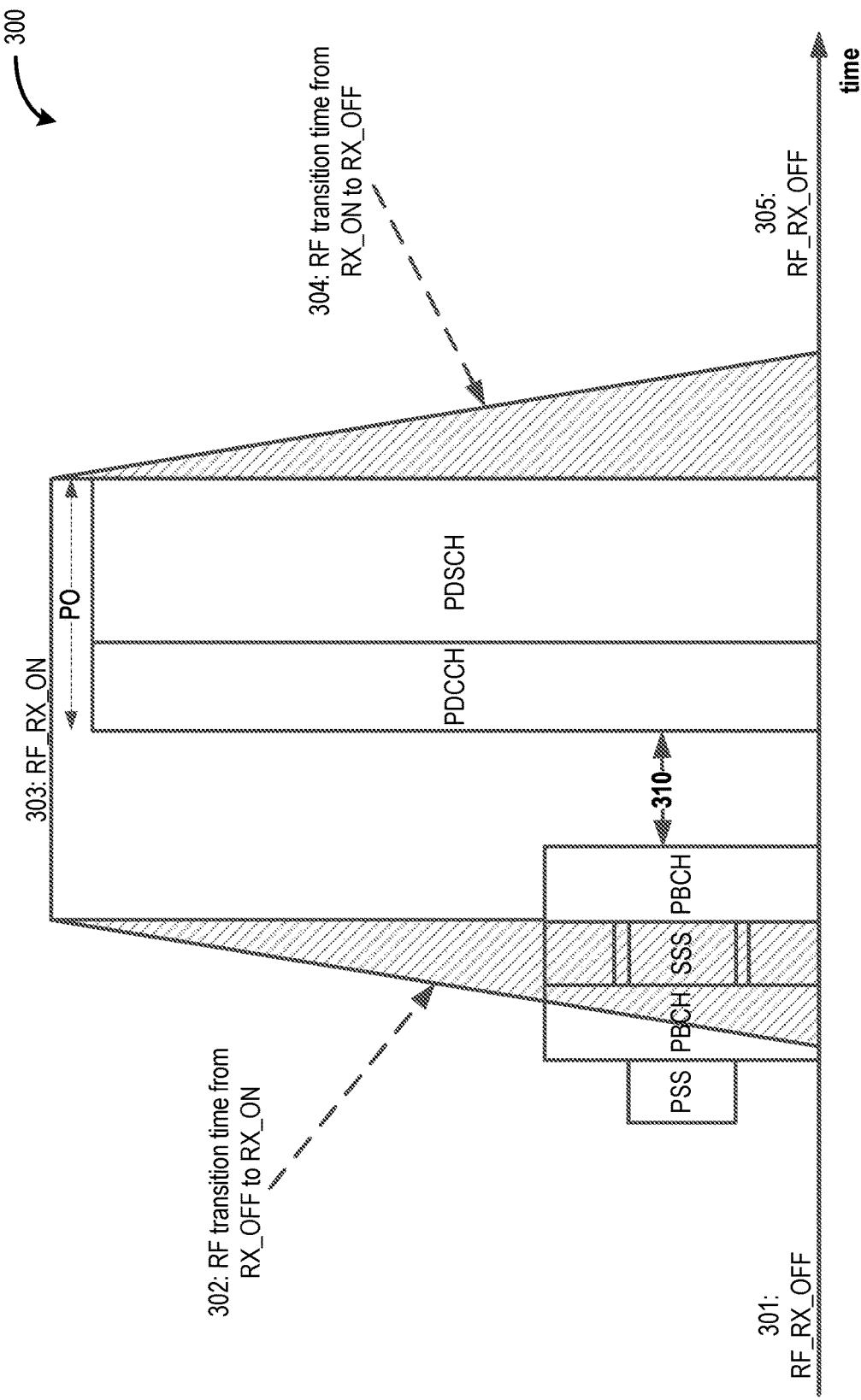
FIG. 3 illustrates an example Rx warm-up overhead reduction embodiment that uses opportunistic skipping of leading SSB reference symbols.

FIG. 3 illustrates an example graph 300 showing SSB warm-up overhead reduction by opportunistically skipping the leading reference symbols within an SSB, according to various embodiments. The graph 300 shows the ON and OFF state transitions of the Rx RF chain or RF circuitry of the UE 101 for receiving/measuring an SSB and a PO. In this example, SSB and PO may be TDMed or FDMed as discussed previously, and/or the SSB may be QCLed with the PO.

In FIG. 3, the RF circuitry is first in the OFF state for a period of time 301 (e.g., "RF_RX_OFF" in FIG. 3), and then transitions to the ON state during a transition time 302 (also referred to as "DRX warm-up 302," "warm-up period 302," or the like) to receive or measure an SSB and receive a corresponding paging. The RF circuitry remains in the ON state for the duration of the reception period 303 (e.g., "RF_RX_ON_1" in FIG. 3). The SSB includes a PSS, SSS, and PBCH, and the paging includes a PDCCH and a PDSCH. Additionally, the reception of the SSB and the PO are separated by the SSB-PO time gap 310 (also referred to as a "low time gap 310," "short time gap 310," or the like) during which the RF circuitry of the UE 101 is turned off. After reception of the SSB and associated paging, the RF circuitry transitions to the OFF state during a transition time 304 (also referred to as "cool-down 304," "cool-down period 304," or the like), and remains in the OFF state for another period of time 305.

In the example of FIG. 3, only the last PBCH symbol (containing the DMRS) within the SSB is used for DRX warm-up 302, while the three other symbols are skipped to reduce warm-up 302 overhead. In this embodiment, skipping the leading reference symbols within the SSB is opportunistically activated when the timing drift is predicted to be relatively low (e.g., shorter DRX cycle length or lower UE mobility). In some implementations, the timing drift level can be predicted based on timing error estimation from a previous DRX ON duration 303 using DMRS within the PO. In addition, as mentioned previously, the SSB-PO time gap 310 between the SSB and the QCLed PO is too short for ON duration splitting (as in the embodiment described with respect to FIG. 2), and therefore, SSB and PO reception in this example has the same RF BW. In some embodiments, the leading SSB symbol down-selection can be also applied in a same way when SSB and the QCLed PO is split into dis-contiguous ON duration portions with different RF BWs, as is the case for the example of FIG. 2. Moreover, this embodiment can be extended for other combinations of leading symbols skipping, for example, skipping PSS and the first PBCH symbol while keeping SSS and the last PBCH symbol.

Figure 4:
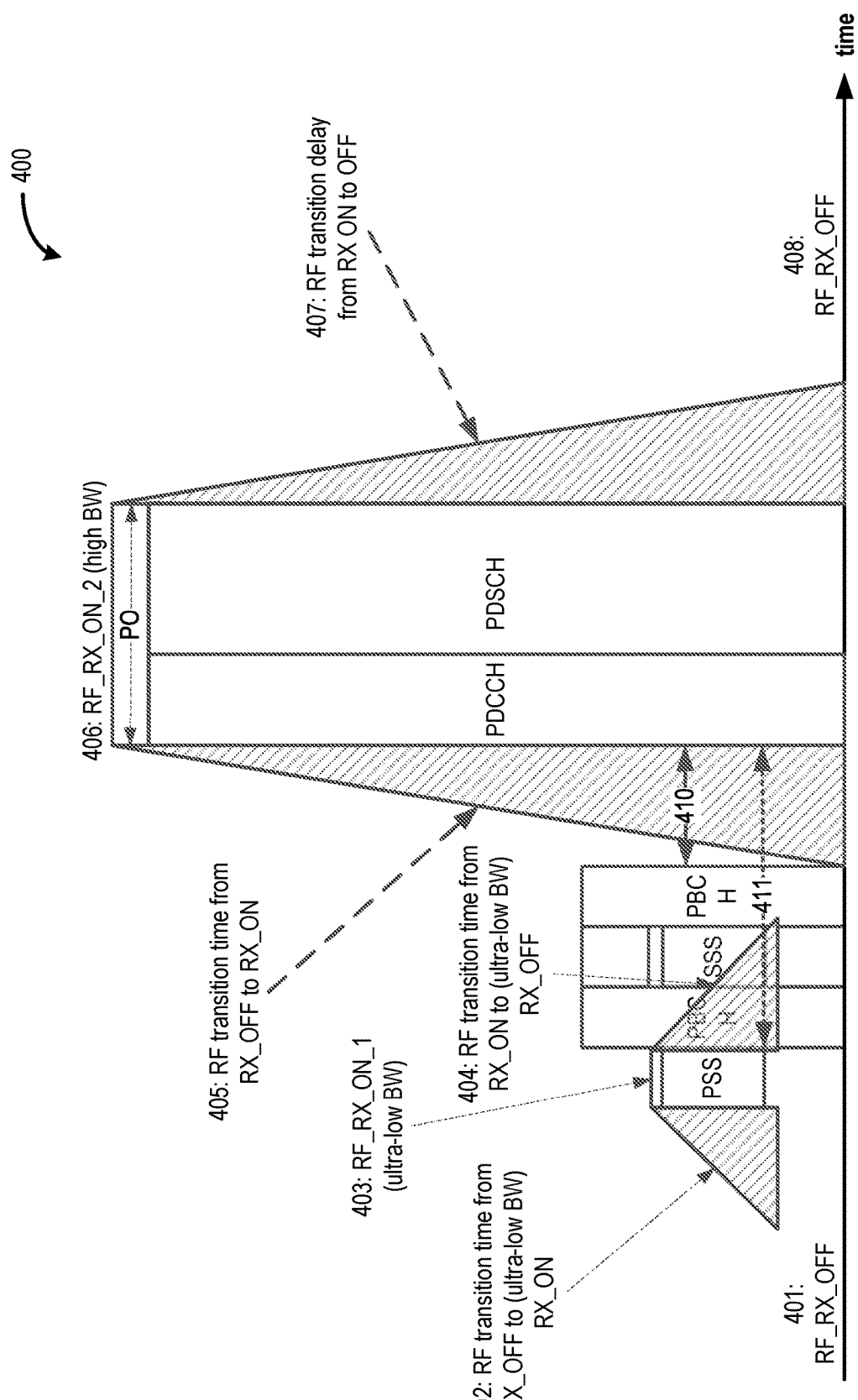
FIG. 4 illustrates an example Rx warm-up overhead reduction embodiment that uses opportunistic skipping of ending SSB reference symbols.

FIG. 4 illustrates an example graph 400 showing SSB warm-up overhead reduction by opportunistically skipping the ending reference symbols within an SSB, according to various embodiments. The graph 400 shows the ON/OFF state transitions of an Rx RF chain or RF circuitry of the UE 101 for receiving/measuring an SSB and a PO, which may be TDMed or FDMed and/or QCLed with one another.

In FIG. 4, the RF circuitry is first in the OFF state for a period of time 401 (e.g., "RF_RX_OFF" in FIG. 4), and then transitions to an ultra-low BW ON state (e.g., "RF_RX_ON_1 (ultra-low BW)" in FIG. 4) during a transition time 402 (also referred to as an "SSB warm-up 402," "SSB warm-up period 402," or the like) to receive an SSB. The RF circuitry remains in the ultra-low BW ON state for the duration of the SSB reception period 403 (e.g., "RF_RX_ON_1 (ultra-low BW)" in FIG. 4). After reception of the SSB, the RF circuitry transitions to the OFF state (or to a power level that is nearly OFF) during a transition time 404 (also referred to as an "SSB cool-down 404," "SSB cool-down period 404," or the like). The RF circuitry transitions from the OFF, nearly OFF, or ultra-low BW ON state to a high BW ON state during a transition time 405 (also referred to as a "PO warm-up 405," "PO warm-up period 405," or the like) to receive a PDCCH and PDSCH during the PO. The RF circuitry remains in the high BW ON state for the duration of the PO reception period 406 (e.g., as indicated by "RF_RX_ON_2 (high BW)" in FIG. 4), transitions to the OFF state during a transition time 407 (also referred to as a "PO cool-down 407," "PO cool-down period 407," or the like) after the PO reception period 406, and remains in the OFF state for another period of time 408. After reception of the SSB and associated paging, the RF circuitry transitions to the OFF state during a transition time 405 (also referred to as "cool-down 405," "cool-down period 405," or the like), and remains in the OFF state for another period of time 406.

In this example, only the first PSS symbol within the SSB are used for RF circuitry (SSB) warm-up, while the three other symbols are skipped to reduce the warm-up overhead. The example of FIG. 4 may be opportunistically activated when the warm-up SSB is detected to be free or almost free from colliding interference from other neighboring cell SSBs. In some embodiments, colliding SSB interference can be blindly detected by the UE 101 based on detection of SSS based neighboring cell ID in a previous DRX ON duration.

Additionally, in the example of FIG. 4, the reception of the SSB and the PO are separated by the SSB-PO time gap 410 (also referred to as a "low time gap 410," "short time gap 410," or the like). Similar to the time gap 310 in FIG. 3, the time gap 410 between a SSB and the associated PO is not long enough to be split into dis-contiguous portions. However, skipping the ending symbols (SSS and PBCH) within the SSB, the time gap 410 is extended to be time gap 411 (also referred to as a "pseudo time gap 411" or the like) during which the RF circuitry is turned off, nearly off, muted, or otherwise powered down. This allows the ON duration to be split into two dis-contiguous portions for separate RF BW and sampling rate settings for SSB reception and PO reception, thereby resulting in minimal ON duration overhead as compared to convention schemes.

Each of the UEs 101, RAN nodes 111, AP 106, network element(s) 122, application servers 130, and/or any other device or system discussed previously with respect to FIGS. 1-4 may include various hardware and/or software elements, such as baseband circuitry, memory, RF circuitry, and I/O interface circuitry, some or all of which may be coupled with one another via a suitable interconnect technology. Additional elements may also be included in, or communicatively coupled with, such computing systems, devices, controllers, etc., such as, for example, application (processor) circuitry, persistent storage circuitry, user interface elements/circuitry, hardware accelerator circuitry, one or more batteries, power management integrated circuitry (PMIC) and/or battery management system (BMS) circuitry, power tee circuitry, satellite positioning circuitry (e.g., GPS, GNSS, etc.), network controller circuitry, network interface connectors, display device(s), sensors, actuators, and/or other like components/elements. Some of these hardware elements may be implemented as a solder-down substrate including one or more integrated circuits (ICs), a single packaged IC soldered to a main circuit board or a multi-chip package (MCP) containing two or more ICs. In one example, the components of the baseband circuitry may be suitably combined in a single chip or chipset, or disposed on a same circuit board. In another example, some or all of the constituent components of the baseband circuitry and an RF circuitry may be implemented together such as on a system on a chip (SoC) or System-in-Package (SiP). In another example, some or all of the constituent components of the baseband circuitry may be implemented as a separate SoC that is communicatively coupled with and RF circuitry (or multiple instances of RF circuitry). In other embodiments, any combination of the previously described components may be included in more than one device depending on a desired implementation.

The term "circuitry" as used herein refers to a circuit or system of multiple circuits configured to perform a particular function in an electronic device. The circuit or system of circuits may be part of, or include one or more hardware components, such as logic circuits, processor(s) (shared, dedicated, or group) and/or memory (shared, dedicated, or group), Integrated Circuits (ICs), Application-specific ICs (ASICs), Field Programmable Gate Arrays (FPGAs), Digital Signal Processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "processor circuitry" as used herein refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" refers to one or more independent electronic circuits packaged onto a circuit board, FPGA, ASIC, SoC, SiP, etc., configured to provide a basic function within a computer system. A "module" may include a processor circuitry (shared, dedicated, or group) and/or memory circuitry shared, dedicated, or group), etc., that execute one or more software or firmware programs, a combinational logic circuit, and/or other suitable components that provide the described functionality. As used herein, the term "interface circuitry" refers to, is part of, or includes circuitry providing for the exchange of information between two or more components or devices. The term "interface circuitry" refers to one or more hardware interfaces, for example, buses, input/output (I/O) interfaces, peripheral component interfaces, network interface cards, and/or the like.

Figure 5:
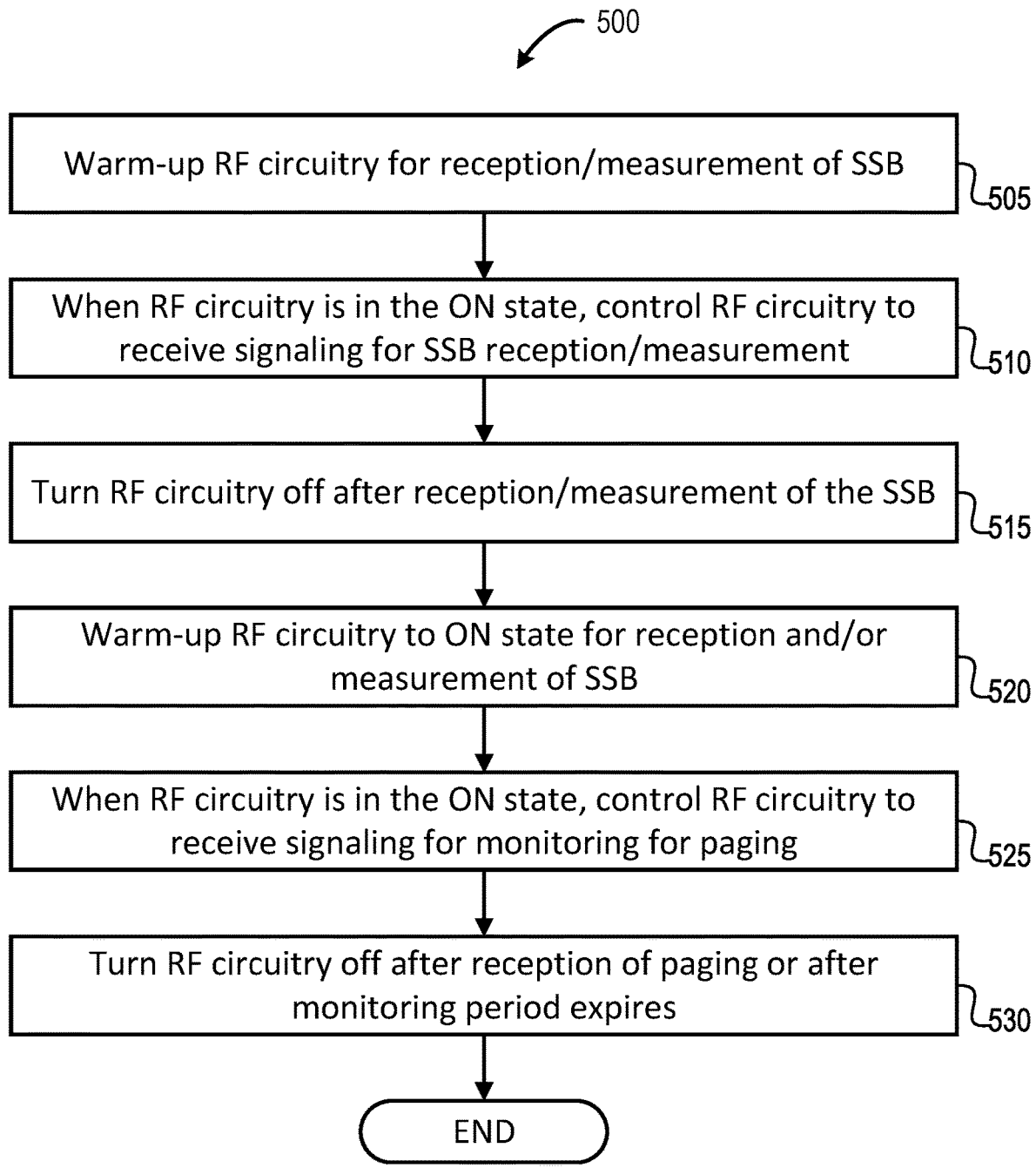
FIGS. 5-6 depict example processes for practicing the various embodiments discussed herein.
Figure 6:
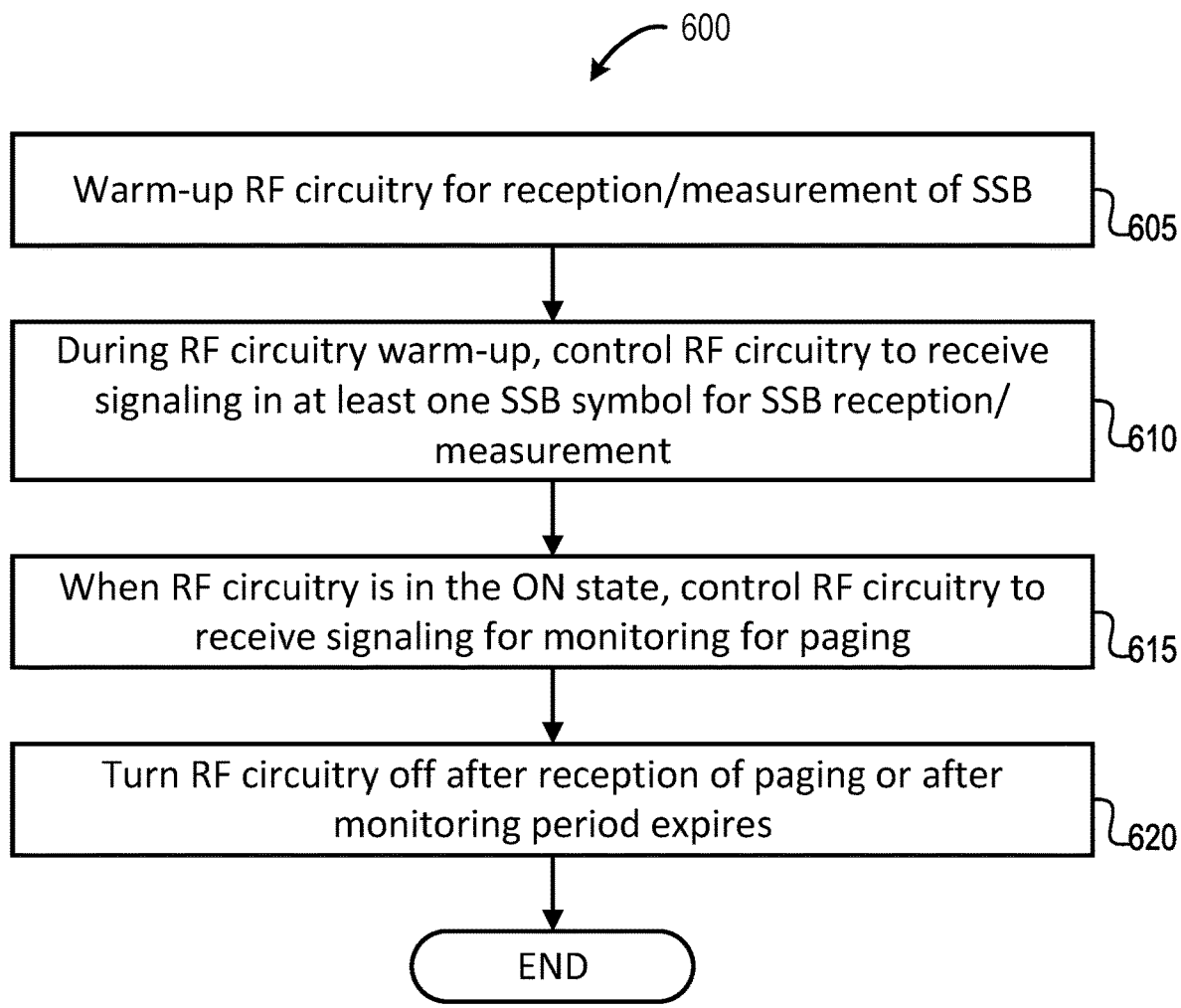

FIGS. 5-6 show example procedures 500-600, respectively, in accordance with various embodiments. For illustrative purposes, the various operations of processes 500-600 are described as being performed by UEs 101 of FIG. 1 or elements thereof. In some embodiments, the processes 500-600 may be embodied as one or more computer readable storage media comprising program code, instructions, or other like a computer program product (or data to create the computer program product), which is to cause the baseband circuitry of the UE 101 to perform electronic operations and/or to perform the specific sequence or flow of actions described with respect to FIGS. 5-6. While particular examples and orders of operations are illustrated FIGS. 5-6, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 5 shows an adaptive Rx switching process 500 according to various embodiments. Process 500 begins at operation 505 where the baseband circuitry of the UE 101 in RRC_IDLE instructs or causes the RF circuitry to turn on, and the RF circuitry warms up to receive and/or measure an SSB. In some embodiments, the RF circuitry may be powered to a relatively low power level, or to a low BW ON state. At operation 510, when the RF circuitry is in the ON state, the baseband circuitry controls the RF circuitry to receive SSB signaling for reception/measurement of the SSB. In these embodiments, the RF circuitry remains in the ON state for duration of the reception/measurement of the SSB. In some embodiments, measuring the SSB includes measuring one or more of a PSS, SSS, and/or PBCH of the SSB. After reception/measure of the SSB, at operation 515 the baseband circuitry turns the RF circuitry off, and the RF circuitry transitions to the OFF state or cools down. After some amount of time, at operation 520 the baseband circuitry causes the RF circuitry to turn back on, and the RF circuitry warms up to monitor a PCH for a Paging message (or ShortMessage) during a PO. As mentioned previously, the Paging message (or Short Message) may be included in, or carried by the PDCCH and/or PDSCH during the PO. At operation 525, when the RF circuitry is in the ON state, the baseband circuitry controls the RF circuitry to receive signaling for monitoring for the paging. In some embodiments, the RF circuitry may be powered to a relatively high power level, or to a high BW ON state. In some embodiments, the RF circuitry remains in the ON state for duration of the PO or PDCCH monitoring occasions of the PO. After monitoring for the paging, at operation 530 the baseband circuitry turns the RF circuitry off, and the RF circuitry transitions to the OFF state or cools down. After operation 530, process 500 ends or may repeat as necessary.

FIG. 6 depicts an example opportunistic SSB symbol skipping process 600 according to various embodiments. Process 600 begins at operation 605 where the baseband circuitry of the UE 101 in RRC_IDLE instructs or causes the RF circuitry to turn on, and the RF circuitry warms up to receive and/or measure an SSB. At operation 610, the baseband circuitry controls the RF circuitry to receive signaling in at least one SSB symbol for reception/measurement of the SSB during the RF circuitry warm-up while measurement/reception of the other SSB symbols are skipped to reduce warm-up overhead. At operation 615, when the RF circuitry is in the ON state, the baseband circuitry controls the RF circuitry to receive signaling for monitoring a PCH for a Paging message (or Short Message) during a PO. As mentioned previously, the Paging message (or Short Message) may be included in, or carried by the PDCCH and/or PDSCH during the PO. In embodiments, the RF circuitry remains in the ON state for duration of the PO or PDCCH monitoring occasions of the PO. In some embodiments, the RF circuitry may be powered to a relatively high power level, or to a high BW ON state. After monitoring for the paging, at operation 620 the baseband circuitry turns the RF circuitry off, and the RF circuitry transitions to the OFF state or cools down. After operation 620, process 600 ends or may repeat as necessary.

In one embodiment, at operation 610 the at least one SSB symbol is only the last PBCH symbol that contains the DMRS. In another embodiment, at operation 610 the at least one SSB symbol includes both the SSS and the last PBCH symbol that contains the DMRS, where the PSS and the first PBCH symbol are skipped. In either of these embodiments, operation 610 is opportunistically activated in response to predicting a timing drift to be below a threshold. This threshold may be a DRX cycle length or based on UE mobility. In some implementations, the timing drift level can be predicted based on timing error estimation from a previous DRX ON duration using the DMRS within the PO. In other embodiments, at operation 610 the at least one SSB symbol is only the first PSS symbol within the SSB, while the three other symbols are skipped to reduce warm-up overhead. In this embodiment, operation 610 is opportunistically activated in response to detecting that the SSB is free or almost free from colliding interference from other neighboring cell SSBs. In some embodiments, the baseband circuitry blindly detects colliding SSB interference based on detection of the SSS based neighboring cell ID during a previous DRX ON duration.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes a method to be performed by a System-on-Chip (SoC) implemented in a user equipment (UE), the SoC comprising baseband circuitry coupled with interface circuitry, the interface circuitry to communicatively couple the baseband circuitry to radiofrequency (RF) circuitry, the method comprising: during one discontinuous reception (DRX) cycle while operating in an idle mode, activating, by the baseband circuitry, the RF circuitry during a measurement period for performance of one or more measurements; and activating, by the baseband circuitry, the RF circuitry during a paging occasion (PO) for reception of a paging message.

Example 2 includes the method of example 1, wherein the one or more measurements include serving cell or intra-frequency measurements.

Example 3 includes the method of example 1, further comprising: performing, by the baseband circuitry, one or more inter-frequency measurements every other DRX cycle when the DRX cycle is less than a predefined period of time.

Example 4 includes the method of example 3, further comprising: applying, by the baseband circuitry, a scaling factor to the one or more inter-frequency measurements when the DRX cycle is less than a predetermined amount of time.

Example 5 includes the method of example 4, wherein the predefined period of time is 320 milliseconds, and the scaling factor is 1.5 or up to 8 for frequency range 2.

Example 6 includes the method of examples 1-5, further comprising: turning off or muting, by the baseband circuitry, the RF circuitry between the measurement period and the PO.

Example 7 includes the method of examples 1-6, wherein the one or more measurements include measurement of a synchronization signal block (SSB).

Example 8 includes the method of example 7, further comprising: during the measurement period, skipping, by the baseband circuitry, measurement of one or more leading symbols of the SSB; or skipping, by the baseband circuitry, measurement of one or more ending symbols of the SSB.

Example 9 includes the method of example 8, wherein skipping measurement of the one or more leading symbols comprises measuring, by the baseband circuitry, only a last Physical Broadcast Channel (PBCH) symbol containing a Demodulation Reference Signal (DMRS) within the SSB.

Example 10 includes the method of example 8, wherein skipping measurement of the one or more leading symbols comprises measuring, by the baseband circuitry, a Secondary Synchronization Signal (SSS) symbol and a last PBCH symbol containing a DMRS within the SSB.

Example 11 includes the method of examples 8-10, wherein skipping measurement of the one or more leading symbols comprises: activating, by the baseband circuitry, the RF circuitry in response to detection of low timing drift conditions.

Example 12 includes the method of example 11, wherein detecting the low timing drift conditions comprises: predicting, by the baseband circuitry, the timing drift level based on timing error estimation from a previous DRX cycle using a DMRS within the PO.

Example 13 includes the method of example 8, wherein skipping measurement of the one or more ending symbols comprises: measuring, by the baseband circuitry, only a first primary synchronization signal (PSS) within the SSB.

Example 14 includes the method of example 14, wherein skipping measurement of the one or more ending symbols comprises: activating, by the baseband circuitry, the RF circuitry in response to detection of low SSB interference conditions.

Example 15 includes the method of example 15, wherein detecting the low SSB interference conditions comprises: performing, by the baseband circuitry, blind detection of colliding SSB interference based on detection of SSSs based neighboring cell ID during a previous DRX cycle.

Example 16 includes a method to be performed by a baseband chipset implemented in a user equipment (UE) the baseband chipset communicatively coupled with a radiofrequency integrated circuit (RFIC) via an interface, the method comprising: during a discontinuous reception (DRX) cycle while operating in an idle mode, activating, by the baseband chipset, the RFIC during a measurement period for performing cell measurements, the cell measurements including serving cell measurements, intra-frequency cell measurements, or inter-frequency cell measurements; and activating, by the baseband chipset, the RFIC during a paging occasion (PO) for reception of a paging message.

Example 17 includes the method of example 16, wherein when the measurement period is for performing the inter-frequency cell measurements, and when the DRX cycle is less than a predefined period of time, the method further comprises: performing the inter-frequency cell measurements every other DRX cycle; and applying a scaling factor to the inter-frequency cell measurements.

Example 18 includes the method of example 17, further comprising: turning off or muting the RFIC after performing the cell measurements; and initializing the RFIC at a time prior to the PO.

Example 19 includes the method of example 17, further comprising: initializing the RFIC prior to the measurement period; during the RFIC initialization, start performing measurement of at least one synchronization signal block (SSB) symbol of an SSB, the SSB including a Primary Synchronization Signal (PSS) a Secondary Synchronization Signal (SSS) and a Physical Broadcast Channel (PBCH);

and monitoring a paging channel for a paging message after measurement of the at least one SSB symbol and during the PO.

Example 20 includes the method of example 19, wherein the at least one SSB symbol is only a PBCH symbol containing a Demodulation Reference Signal (DMRS) an SSS symbol and the last PBCH symbol containing the DMRS, or only a first PSS symbol.

Example 21 includes the method of examples 16 and 19-20, further comprising: warming up the RFIC prior to the measurement period to a first power level for performing the one or more cell measurements, and warming up the RFIC prior to the PO to a second power level for performing the monitoring, wherein the first power level is smaller than the second power level.

Example 22 includes a method to be performed by a user equipment, the method comprising: activating a transceiver (TRx) to perform one or more cell measurements during a measurement period; receiving, using the TRx, signaling for the one or more cell measurements during the measurement period; activating the TRx to monitor for paging information during a paging occasion (PO); and monitoring for the paging information during the PO, wherein the measurement period and the PO take place during a discontinuous reception (DRX) cycle while the user equipment is operating in an idle mode.

Example 23 includes the method of example 22, wherein performing the one or more cell measurements comprises receiving, using the TRx, synchronization signal block (SSB) signals of one or more SSBs.

Example 24 includes the method of examples 22-23, further comprising: turning off the TRx after performing the one or more cell measurements, and warming up the TRx prior to the PO.

Example 25 includes the apparatus of examples 22-23, further comprising: warming up the TRx prior to the measurement period to a first power level for performing the one or more cell measurements, and warming up the TRx prior to the PO to a second power level for performing the monitoring, wherein the first power level is smaller than the second power level.

Example 26 may include an apparatus comprising means to perform one or more elements of a method described in or related to any of examples 1-25, or any other method or process described herein. Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein. Example 28 may include an apparatus comprising logic, modules, or circuitry to perform one or more elements of a method described in or related to any of examples 1-25, or any other method or process described herein. Example 29 may include a method, technique, or process as described in or related to any of examples 1-25, or portions or parts thereof. Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof. Example 31 may include a signal as described in or related to any of examples 1-25, or portions or parts thereof. Example 32 may include a datagram, packet, frame, segment, protocol data unit (PDU), or message as described in or related to any of examples 1-25, or portions or parts thereof, or otherwise described in the present disclosure. Example 33 may include a signal encoded with data as described in or related to any of examples 1-25, or portions or parts thereof, or otherwise described in the present disclosure. Example 34 may include a signal encoded with a datagram, packet, frame, segment, protocol data unit (PDU), or message as described in or related to any of examples 1-25, or portions or parts thereof, or otherwise described in the present disclosure. Example 35 may include an electromagnetic signal carrying computer-readable instructions, wherein execution of the computer-readable instructions by one or more processors is to cause the one or more processors to perform the method, techniques, or process as described in or related to any of examples 1-25, or portions thereof. Example 36 may include a computer program comprising instructions, wherein execution of the program by a processing element is to cause the processing element to carry out the method, techniques, or process as described in or related to any of examples 1-25, or portions thereof. Example 37 may include a signal in a wireless network as shown and described herein. Example 38 may include a method of communicating in a wireless network as shown and described herein. Example 39 may include a system for providing wireless communication as shown and described herein. Example 40 may include a device for providing wireless communication as shown and described herein.

Any of the above-described examples may be combined with any other example (or combination of examples), unless explicitly stated otherwise. The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous. The term "coupled" (or variants thereof) may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "communicatively coupled" may mean that two or more elements may be in contact with one another by a means of communication including through a wire or other interconnect connection, through a wireless communication channel or ink, and/or the like.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. A System-on-Chip, "SoC", comprising:
   interface circuitry; and
   baseband circuitry coupled with the interface circuitry, the interface circuitry to communicatively couple the baseband circuitry to radiofrequency, "RF", circuitry, the baseband circuitry to, during one discontinuous reception, "DRX", cycle while operating in an idle mode, activate the RF circuitry during a measurement period for performance of one or more measurements and activate the RF circuitry during a paging occasion, "PO", for reception of a paging message, wherein the one or more measurements include measurement of a synchronization signal block, "SSB", and wherein the baseband circuitry is further configured to, during the measurement period, skip measurement of one or more leading symbols of the SSB or skip measurement of one or more ending symbols of the SSB.

2. The SoC of claim 1, wherein the one or more measurements include serving cell or intra-frequency measurements.

3. The SoC of claim 1, wherein the baseband circuitry is further to perform one or more inter-frequency measurements every other DRX cycle when the DRX cycle is less than a predefined period of time.

4. The SoC of claim 3, wherein the baseband circuitry is further to apply a scaling factor to the one or more inter-frequency measurements when the DRX cycle is less than a predetermined amount of time.

5. The SoC of claim 1, wherein the baseband circuitry is further to turn off or mute the RF circuitry between the measurement period and the PO.

6. The SoC of claim 1, wherein, when the baseband circuitry is to skip measurement of the one or more leading symbols, the baseband circuitry is to measure only a last Physical Broadcast Channel, "PBCH", symbol containing a Demodulation Reference Signal, "DMRS", within the SSB.

7. The SoC of claim 1, wherein, when the baseband circuitry is to skip measurement of the one or more leading symbols, the baseband circuitry is to measure a Secondary Synchronization Signal, "SSS", symbol and a last Physical Broadcast Channel, "PBCH", symbol containing a Demodulation Reference Signal, "DMRS", within the SSB.

8. The SoC of claim 1, wherein, when the baseband circuitry is to skip measurement of the one or more leading symbols, the baseband circuitry is to activate the RF circuitry in response to detection of low timing drift conditions.

9. The SoC of claim 8, wherein, to detect the low timing drift conditions, the baseband circuitry is to predict the timing drift level based on timing error estimation from a previous DRX cycle using a Demodulation Reference Signal, "DMRS", within the PO.

10. The SoC of claim 1, wherein, when the baseband circuitry is to skip measurement of the one or more ending symbols, the baseband circuitry is to activate the RF circuitry in response to detection of low SSB interference conditions.

11. The SoC of claim 10, wherein, to detect the low SSB interference conditions, the baseband circuitry is to perform blind detection of colliding SSB interference based on detection of a Secondary Synchronization Signal, "SSS", based neighboring cell ID during a previous DRX cycle.

12. One or more non-transitory computer-readable storage media, "CRSM", comprising instructions, wherein execution of the instructions by processor circuitry of a baseband chipset implemented in a user equipment, "UE", communicatively coupled with a radiofrequency integrated circuit, "RFIC", implemented in the UE is to cause the baseband chipset to:
   during a discontinuous reception, "DRX", cycle while operating in an idle mode, activate the RFIC during a measurement period for performing cell measurements, the cell measurements including serving cell measurements, intra-frequency cell measurements, or inter-frequency cell measurements, wherein the cell measurements include measurement of a synchronization signal block, "SSB", and wherein the baseband chipset is further caused to, during the measurement period, skip measurement of one or more leading symbols of the SSB or skip measurement of one or more ending symbols of the SSB, and
   activate the RFIC during a paging occasion, "PO", for reception of a paging message.

13. The non-transitory CRSM of claim 12, wherein when the measurement period is for performing the inter-frequency cell measurements, and when the DRX cycle is less than a predefined period of time, execution of the instructions is to cause the baseband chipset to:
   perform the inter-frequency cell measurements every other DRX cycle; and apply a scaling factor to the inter-frequency cell measurements.

14. The non-transitory CRSM of claim 13, wherein execution of the instructions is to cause the baseband chipset to: turn off or mute the RFIC after performance of the cell measurements; and initialize the RFIC at a time prior to the PO.

15. The non-transitory CRSM of claim 13, wherein execution of the instructions is to cause the baseband chipset to:
   initialize the RFIC prior to the measurement period;
   during the RFIC initialization, start measurement of at least one SSB symbol, the SSB including a Primary Synchronization Signal, "PSS", a Secondary Synchronization Signal, "SSS", and a Physical Broadcast Channel, "PBCH"; and
   monitor a paging channel for the paging message after measurement of the at least one SSB symbol and during the PO; and
   wherein the at least one SSB symbol is only a PBCH symbol containing a Demodulation Reference Signal, "DMRS", an SSS symbol and the last PBCH symbol containing the DMRS, or only a first PSS symbol.

16. The non-transitory CRSM of claim 12, wherein execution of the instructions is to cause the baseband chipset to: warm up the RFIC prior to the measurement period to a first power level for performing the one or more cell measurements, and warm up the RFIC prior to the PO to a second power level for monitoring the paging channel, wherein the first power level is smaller than the second power level.

17. An apparatus to be implemented in a user equipment, the apparatus comprising:
   activation means for activating radiofrequency means to perform one or more cell measurements during a measurement period, and for activating the radiofrequency means to monitor for paging information during a paging occasion, "PO", wherein the one or more cell measurements include measurement of a synchronization signal block, "SSB", and wherein the activation means, during the measurement period, skips activation of the radio frequency means to skip measurement of one or more leading symbols of the SSB or skip measurement of one or more ending symbols of the SSB; and the radiofrequency means for receiving signaling for the one or more cell measurements during the measurement period, and for monitoring for the paging information during the PO, wherein the measurement period and the PO take place during a discontinuous reception, "DRX", cycle while the user equipment is operating in an idle mode.

18. The apparatus of claim 17, wherein the activation means is for turning off the radiofrequency means after performing the one or more cell measurements, and warming up the radiofrequency means prior to the PO.

19. The apparatus of claim 17, wherein the activation means is for warming up the radiofrequency means prior to the measurement period to a first power level for performing the one or more cell measurements, and warming up the radiofrequency means prior to the PO to a second power level for performing the monitoring, wherein the first power level is smaller than the second power level.

* * * * *